US011335077B1

(12) United States Patent
Salmani Rahimi et al.

(10) Patent No.: US 11,335,077 B1
(45) Date of Patent: May 17, 2022

(54) GENERATING AND MODIFYING REPRESENTATIONS OF DYNAMIC OBJECTS IN AN ARTIFICIAL REALITY ENVIRONMENT

(71) Applicant: Facebook Technologies, LLC, Menlo Park, CA (US)

(72) Inventors: Mahdi Salmani Rahimi, San Francisco, CA (US); Gregory Mayo Daly, Seattle, WA (US); Gian Diego Tipaldi, Zurich (CH); Alexander Sorkine Hornung, Zurich (CH); Mark David Strachan, San Francisco, CA (US)

(73) Assignee: Facebook Technologies, LLC., Menlo Park, CA (US)

( * ) Notice: Subject to any disclaimer, the term of this patent is extended or adjusted under 35 U.S.C. 154(b) by 0 days.

(21) Appl. No.: 17/206,541

(22) Filed: Mar. 19, 2021

(51) Int. Cl.
*G09G 5/00* (2006.01)
*G06T 19/20* (2011.01)
*G06T 17/20* (2006.01)
*G06N 3/02* (2006.01)
*G06T 7/70* (2017.01)
*G06T 19/00* (2011.01)

(52) U.S. Cl.
CPC .............. *G06T 19/20* (2013.01); *G06N 3/02* (2013.01); *G06T 7/70* (2017.01); *G06T 17/20* (2013.01); *G06T 19/006* (2013.01); *G06T 2219/2004* (2013.01)

(58) Field of Classification Search
CPC ................................................... G06T 19/006
See application file for complete search history.

(56) References Cited

U.S. PATENT DOCUMENTS

| 2012/0206452 | A1* | 8/2012 | Geisner | H04S 7/304 345/419 |
| 2017/0205892 | A1* | 7/2017 | Petrovskaya | G06F 3/011 |
| 2019/0066380 | A1* | 2/2019 | Berk | G06F 3/017 |
| 2019/0087992 | A1* | 3/2019 | Clarberg | G06T 11/40 |
| 2020/0156246 | A1* | 5/2020 | Srivastav | B25J 9/163 |

* cited by examiner

*Primary Examiner* — Charles Tseng
(74) *Attorney, Agent, or Firm* — Baker Botts L.L.P.

(57) ABSTRACT

A method includes receiving an image of a real environment using a camera worn by a user, and determining a portion of the image that comprises an object of interest. Based on the portion of the image that comprises the object of interest, a surface representing the object of interest is generated. Depth measurements of the real environment corresponding to the portion of the image comprising the object of interest are received and used to determine a depth of the surface representing the object of interest. The surface is posed in a coordinate system corresponding to the real environment based on the depth of the surface and a visibility of a virtual object is determined relative to the object of interest by comparing a model of the virtual object with the surface. The output image is generated based on the determined visibility of the virtual object.

20 Claims, 11 Drawing Sheets

GENERATING AND MODIFYING REPRESENTATIONS OF DYNAMIC OBJECTS IN AN ARTIFICIAL REALITY ENVIRONMENT

TECHNICAL FIELD

This disclosure generally relates to augmented-reality, virtual-reality, mixed-reality, or hybrid-reality environments.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD 104) connected to a host computer system, a standalone HMD 104, a mobile device or computing system, or any other hardware platform capable of providing artificial reality content to one or more viewers.

Machine-learning models may be trained to recognize object features that have been captured in images. Such models, however, are typically large and require many operations. While large and complex models may perform adequately on high-end computers with fast processors (e.g., multiple central processing units ("CPUs") and/or graphics processing units ("GPUs")) and large memories (e.g., random access memory ("RAM") and/or cache), such models may not be operable on computing devices that have much less capable hardware resources. The problem is exacerbated further by applications that require near real-time results from the model (e.g., 10, 20, or 30 frames per second), such as augmented reality applications that dynamically adjust computer-generated components based on features detected in live video.

SUMMARY OF PARTICULAR EMBODIMENTS

Disclosed methods provide techniques for detecting occlusion of two-dimensional and three-dimensional virtual objects in AR/VR/MR environments by detecting, predicting, and generating a surface to represent the movements of dynamic objects of interest in a real environment, for example a human, animal, vehicle, etc. At a high-level, a computing system associated with an artificial reality system may receive image data of an environment, and detect one or more objects of interest in the artificial reality environment. Using for example, computer vision and/or machine learning models, the computing system may generate and pose a surface representing the detected real object of interest (either in two-dimensions or three-dimensions) in the artificial reality environment displayed to the user. Particular disclosed methods may further determine a depth of the surface and pose the surface based on the depth. The pose may be further based on a prediction of the movement of the object of interest and or the user of the HMD at a future time. In doing so, the computing system may accurately predict and generate a view of an immersive artificial reality environment to the user of the HMD, despite for example, sudden movements of either the user's head or one or more objects in the real environment. Although portions of this disclosure specifically describe detecting and predicting the pose of humans in images of a real environment as, it should be appreciated that these techniques may be incorporated to detect and predict the pose of other objects in interest in a real environment, for example animals, vehicles, projectiles, etc.

In particular embodiments, the generated view may be rendered by one or more components (e.g., CPU, GPU, etc.) of a computing system associated with a device (e.g., a laptop, a cellphone, a desktop, a wearable device). In particular embodiments, the device is in communication with a computing system on the HMD but may be otherwise physically separated from the HMD. As an example and not by way of limitation, this device may be a laptop device that is wired to the HMD or communicates wirelessly with the HMD. As another example and not by way of limitation, the device may be a wearable (e.g., a device strapped to a wrist), handheld device (e.g., a phone), or some other suitable device (e.g., a laptop, a tablet, a desktop) that is wired to the HMD or communicates wirelessly with the HMD. In particular embodiments the device may send this initial view to the HMD for display. In particular embodiments the components of the device that generated the initial view may also generate the one or more surfaces representing the object of interest for the view. As another example and not by way of limitation, an onboard computing system of an HMD may resample and adjust the pose of the one or more surfaces after it receives the initial view from a separate computing system (e.g., from a CPU or GPU of a wearable, handheld, or laptop device) to account for movements of the HMD and/or object of interest that may occur while rendering the initial image.

In particular embodiments, graphics applications (e.g., games, maps, content-providing apps, etc.) may build a scene graph, which is used together with a given view position and point in time to generate primitives to render on a GPU. The scene graph may define the logical and/or spatial relationship between objects in the scene. In particular embodiments, a display engine may also generate and store a scene graph that is a simplified form of the full application scene graph. The simplified scene graph may be used to specify the logical and/or spatial relationships between surfaces (e.g., the primitives rendered by display engine, such as quadrilaterals or contours, defined in 3D space, that have corresponding textures generated based on the mainframe rendered by the application). Storing a scene graph allows display engine to render the scene to multiple display frames, adjusting each element in the scene graph for the current viewpoint (e.g., head position), the current object positions (e.g., they could be moving relative to each other) and other factors that change per display frame. In addition, based on the scene graph, display engine may also adjust for the geometric and color distortion introduced by the display subsystem and then composite the objects together to generate a frame. Storing a scene graph allows display engine to approximate the result of doing a full render at the desired high frame rate, while actually running the GPU at a significantly lower rate.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
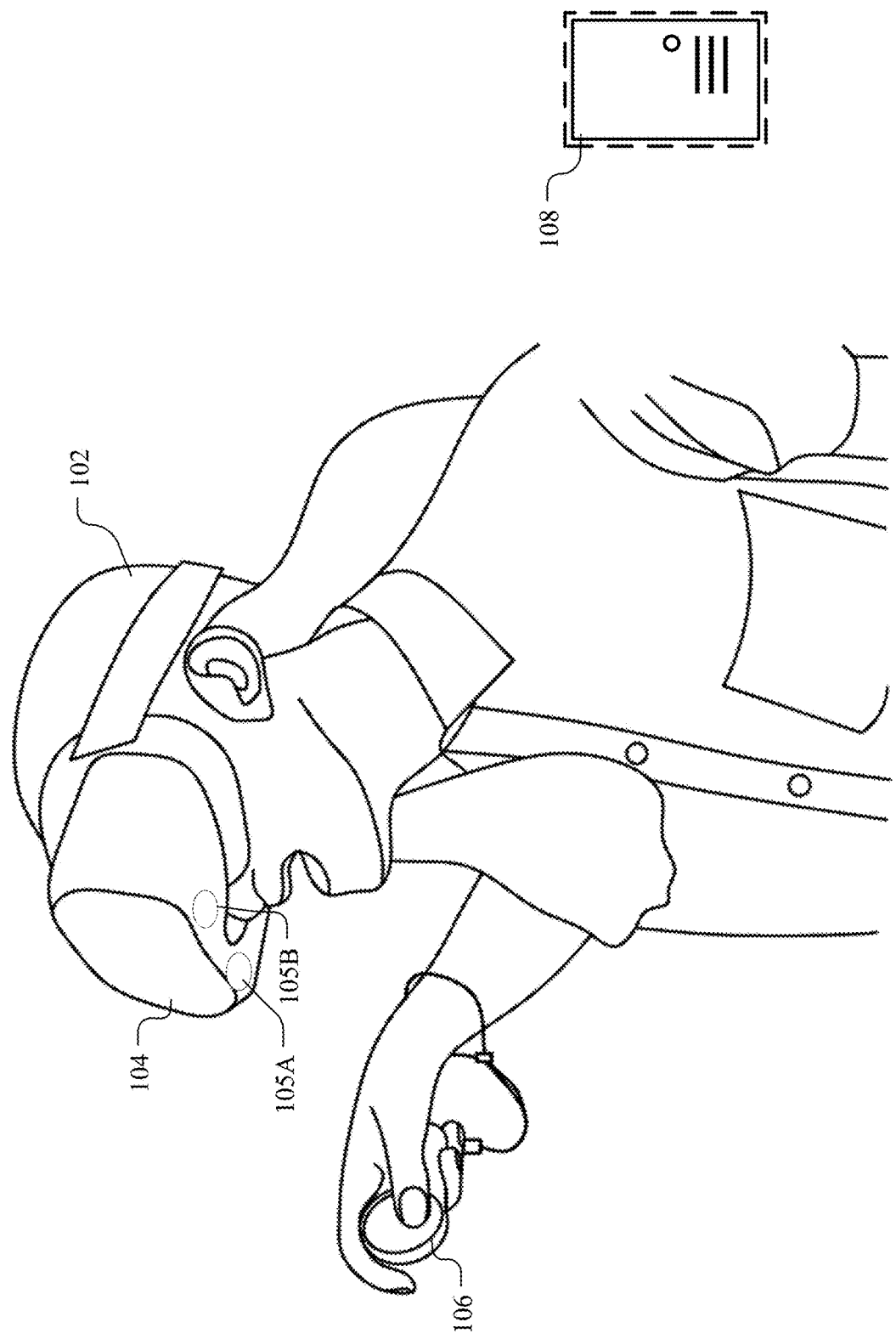
FIG. 1A illustrates an example artificial reality system and user.

FIG. 1A illustrates an example artificial reality system 100 and user 102. In particular embodiments, the artificial reality system 100 may comprise a headset 104, a controller 106, and a computing system 108. A user 102 may wear the headset 104 that may display visual artificial reality content to the user 102. The HMD 104 may include an audio device that may provide audio artificial reality content to the user 102. The headset 104 may include an eye tracking system to determine a vergence distance of the user 102. A vergence distance may be a distance from the user's eyes to objects (e.g., real-world objects or virtual objects in a virtual space) upon which the user's eyes are converged. The headset 104 may be referred to as a head-mounted display (HMD). One or more controllers 106 may be paired with the artificial reality system 100. In particular embodiments, one or more controllers 106 may be equipped with at least one inertial measurement units (IMUs) and infrared (IR) light emitting diodes (LEDs) for the artificial reality system 100 to estimate a pose of the controller and/or to track a location of the controller, such that the user 102 may perform certain functions via the controller 106. In particular embodiments the one or more controllers 106 may be equipped with one or more trackable markers distributed to be tracked by the computing system 108. The one or more controllers 106 may comprise a trackpad and one or more buttons. The one or more controllers 106 may receive inputs from the user 102 and relay the inputs to the computing system 108. The one or more controllers 106 may also provide haptic feedback to the user 102. The computing system 108 may be connected to the headset 104 and the one or more controllers 106 through cables or wireless connections. The one or more controllers 106 may include a combination of hardware, software, and/or firmware not explicitly shown herein so as not to obscure other aspects of the disclosure.

The artificial reality system 100 may further include a computer unit 108. The computer unit may be a stand-alone unit that is physically separate from the HMD or it may be integrated with the HMD. In embodiments where the computer 108 is a separate unit, it may be communicatively coupled to the HMD via a wireless or wired link. The computer 108 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an artificial reality system 100 depends on the capabilities of its computer unit 108.

Figure 1B:
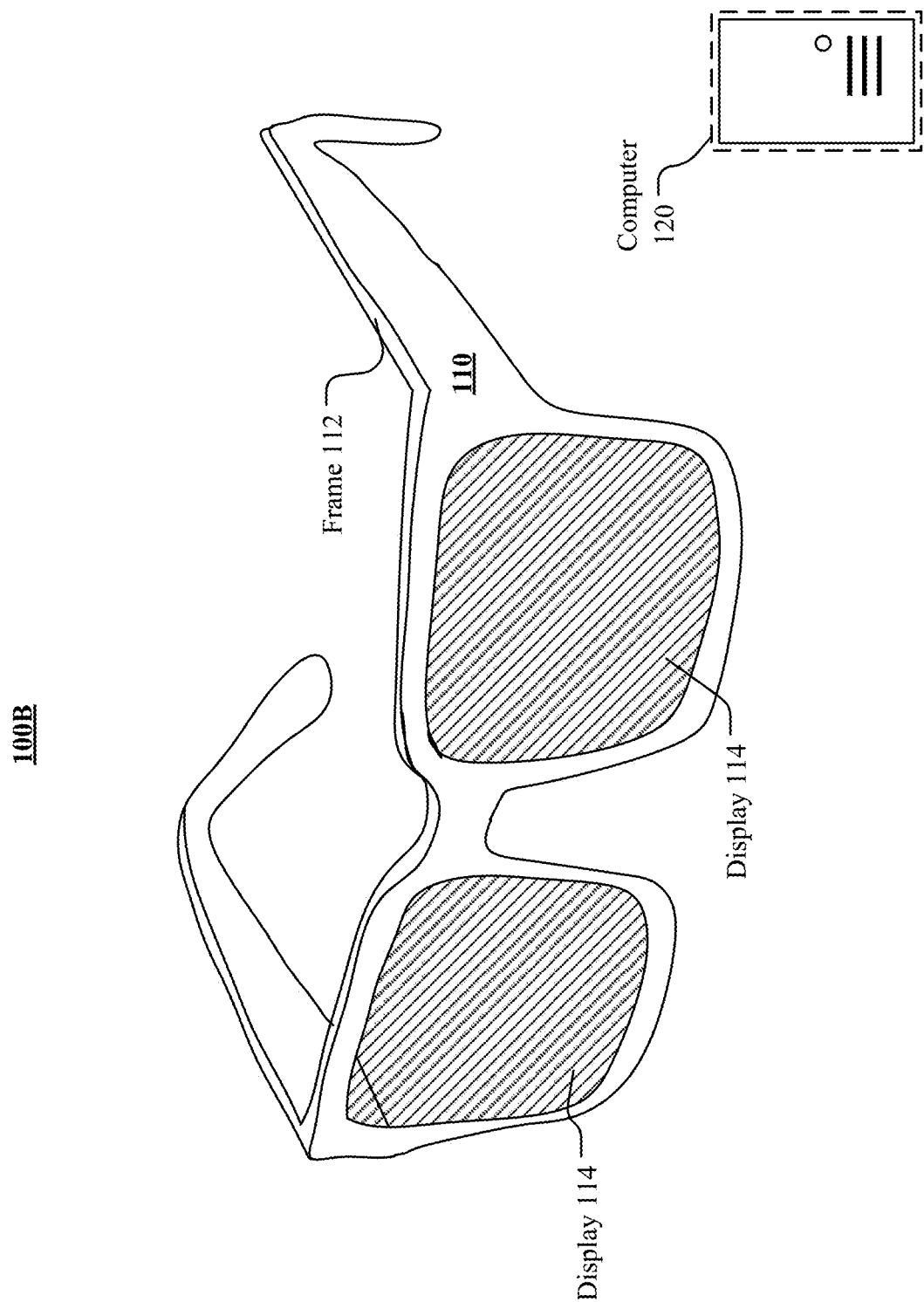
FIG. 1B illustrates an example augmented reality system.

FIG. 1B illustrates an example augmented reality system 100B. The augmented reality system 100B may include an augmented reality head-mounted display (AR HMD) 110 (e.g., glasses) comprising a frame 112, one or more displays 114, and a computing system 120. The displays 114 may be transparent or translucent allowing a user wearing the AR HMD 110 to look through the displays 114 to see the real world and displaying visual artificial reality content to the user at the same time. The AR HMD 110 may include an audio device that may provide audio artificial reality content to users. The AR HMD 110 may include one or more cameras which can capture images and videos of environments. The AR HMD 110 may include an eye tracking system to track the vergence movement of the user wearing the AR HMD 110. Except as where specified throughout this application, the use of "HMD" can be used to refer to either HMD 104 (which may occlude the user's view of the real environment) or AR HMD 110 (which may permit the user to see the real world and displaying visual artificial reality content to the user at the same time).

The augmented reality system 100B may further include a controller comprising a trackpad and one or more buttons. The controller may receive inputs from users and relay the inputs to the computing system 120. The controller may also provide haptic feedback to users. The computing system 120 may be connected to the AR HMD 110 and the controller through cables or wireless connections. The computing system 120 may control the AR HMD 110 and the controller to provide the augmented reality content to and receive inputs from users. The computing system 120 may be a standalone host computer system, an on-board computer system integrated with the AR HMD 110, a mobile device, or any other hardware platform capable of providing artificial reality content to and receiving inputs from users.

The HMD may have external-facing cameras, such as the two forward-facing cameras 105A and 105B shown in FIG. 1A. While only two forward-facing cameras 105A-B are shown, the HMD may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras 105A and 105B are configured to capture the physical environment around the user and may do so continuously to generate a sequence of frames (e.g., as a video).

In particular embodiments, the pose (e.g., position and orientation) of the HMD within the environment may be needed. For example, in order to render an appropriate display for the user 102 while he is moving about in a virtual or augmented reality environment, the system 100 would need to determine his position and orientation at any moment. Based on the pose of the HMD, the system 100 may further determine the viewpoint of either of the cameras 105A and 105B or either of the user's eyes. In particular embodiments, the HMD may be equipped with inertial-measurement units ("IMU"). The data generated by the IMU, along with the stereo imagery captured by the external-facing cameras 105A-B, allow the system 100 to compute the pose of the HMD using, for example, SLAM (simultaneous localization and mapping) or other suitable techniques.

Since its existence, artificial reality (e.g., Augmented Reality (AR), Virtual Reality (VR), Mixed Reality (MR)) technology has been plagued with the problem of latency in rendering AR/VR/MR representations of objects in response to sudden changes in a user's perspective and/or sudden changes in the AR/VR/MR view displayed to the user. For example, users may suddenly need to be able to move their heads around when viewing a scene and the rendered image may need to respond immediately by adjusting the view of one or more virtual representations presented to the user. Additionally, sudden movements of dynamic real objects in the environment (e.g., people, animals, vehicles, etc.) further contribute to slight changes to the user's perspective of the scene that may adjust the user's perspective. These movements may be small but sporadic and difficult (if not impossible) to predict.

Moreover, these movements may occur quickly, requiring that the rendered view of the artificial reality environment be modified rapidly to account for changes in perspective that occur. If this is not done rapidly enough, the resulting latency may cause a user to experience a sensory dissonance that can lead to virtual reality sickness or discomfort, or at the very least, a disruption to the immersive nature of the experience. For example, sudden movements may result in virtual content that is rendered and improperly displayed over real objects. This is of particular importance in environments with abundant, dynamic objects, like people. Unlike walls and large pieces of furniture, people are highly dynamic and frequently occurring features of real environments, especially urban real environments. Coordinate-locked virtual objects in real environments will regularly have humans move nearby. Without proper detection and adjustments for these movements, these coordinate-locked virtual objects may be rendered over humans that are closer to the user than the virtual object, resulting in a less-immersive experience. Thus, to properly address a user's expectation of AR immersion, virtual objects that fall behind other real objects (e.g., people) in the artificial reality environment must be occluded and/or blended with the real objects around it. The failure to do so breaks the immersion of AR and the perception of depth of virtual content.

Traditional three-dimensional artificial reality environment reconstruction techniques and algorithms may integrate depth information about the real environment gradually over time to create a 3D mesh of the world. However, these methods are inherently too slow to detect and re-render the view to account for movement of highly dynamic objects that may occlude the artificial reality environment (e.g., people, animals, vehicles, etc.). For example, re-rendering a view in its entirety to account for these changes in perspective is resource intensive, and it may only be possible to do so at a relatively low frame rate (e.g., 60 Hz, or once every $\frac{1}{60}$th of a second). As a result, it may not be feasible to modify the view by re-rendering the entire view to account for changes in perspective at a pace that is rapid enough (e.g., 200 Hz, once every $\frac{1}{200}$th of a second) to prevent the user from perceiving latency and to thereby avoid or sufficiently reduce sensory dissonance.

Moreover, traditional artificial reality environment reconstruction techniques and algorithms may require expensive computing resources that limit the ability to recreate the artificial reality environment using components that are compact enough to be housed within an HMD, especially an AR HMD with a small form factor. Yet, the time scales involved are often so small that it may be unfeasible to have a more powerful system that is physically separated from the HMD (e.g., a separate laptop or wearable device) perform the modification, because the HMD would have to transmit the captured image as well as information about the current position and orientation of the HMD, wait for the separate system to detect objects in the image and render the new view, and then receive the new view from the separate system.

One solution to these traditional methods involves generating and resampling "surfaces." A surface may be one or more primitives rendered by display engine, such as quadrilaterals or contours, defined in 3D space, that have corresponding textures generated based on the mainframe rendered by the application. In particular embodiments one or more surfaces may represent a particular view of an objects within the artificial reality environment, where a surface corresponds to one or more objects that are expected to move/translate, skew, scale, distort, or otherwise change in appearance together, as one unit, as a result of a change in perspective. This method may essentially be an efficient shortcut for adjusting a view in response to head movements of the user, and may significantly reduce the processing that is required and thus ensure that the view is updated quickly enough to sufficiently reduce latency. Methods for generating and modifying representations of objects in an augmented-reality or virtual reality environment are disclosed in U.S. patent application Ser. No. 16/586,590, filed 27 Sep. 2019, which is incorporated by reference. In particular embodiments, resampling surfaces in response to sudden movements, unlike re-rendering entire views, may be efficient enough that it can be used to modify views within the allotted time with the relatively limited processing power of a computing system of a HMD, especially an AR HMD that may be designed with a small form-factor to closely resemble a conventional pair of eyeglasses. By simply resampling surfaces, the modification may be performed entirely on the HMD, thus speeding up the process.

Disclosed methods provide techniques for detecting occlusion of two-dimensional and three-dimensional virtual objects in AR/VR/MR environments by detecting, predicting, and generating a surface to represent the movements of dynamic objects in the artificial reality environment, for example a human, animal, vehicle, etc. At a high-level, a computing system associated with an artificial reality system may receive image data of an environment, and detect one or more dynamic objects of interest (alternatively referred to as "dynamic object" or "object of interest" herein) in the artificial reality environment. Using for example, computer vision and/or machine learning models, the computing system may generate and pose a surface representing the detected real object of interest (either in two-dimensions or three-dimensions) in the artificial reality environment displayed to the user. Particular disclosed methods may further determine a depth of the surface and pose the surface based on the depth value. The pose may be based on a prediction of the movement of the object of interest and or the user of the HMD at a future time. In doing so, the computing system may accurately predict and render an immersive artificial reality environment to the user of the HMD, despite for example, sudden movements of either the user's head or one or more objects in the real environment. Although portions of this disclosure specifically describe detecting and predicting the pose of humans in images of a real environment as, it should be appreciated that these techniques may be incorporated to detect and predict the pose of other objects in interest in a real environment, for example animals, vehicles, projectiles, etc.

Embodiments of the invention may include or be implemented in conjunction with an artificial reality system. In particular embodiments, the processing tasks involved in rendering an artificial reality environment and generating and modifying its surfaces may be split among two or more computing systems. As an example and not by way of limitation, a view of a real environment may initially be rendered by a first computing system (e.g., a laptop, a cellphone, a desktop, a wearable device). The rendered results may be used to generate one or more surfaces for the view and/or one or more surfaces representing a dynamic real object detected in the image. In addition to texture, color, and transparency information, the surfaces may include information about their location in the artificial reality environment. These surfaces may be passed to a second computing system (e.g., an onboard computing system on an HMD). The HMD may warp the surfaces within the view based on the information associated with the surfaces (e.g., movement of the corresponding object of interest) and based on a current perspective of the user wearing the HMD (e.g., as determined by the position and orientation of the HMD). Any changes in the user's perspective (which may occur both due to e.g., (1) slight head motions of the user and (2) movements of the object of interest in the real environment), which may occur on the order of a hundredth of a second, may be tracked by received image data and sensors on the HMD and accounted for by resampling the surfaces in a view to render a time-adjusted viewpoint. Due to the adjustment of the viewpoint, the surfaces may be translated/moved, skewed, scaled, distorted, or otherwise changed in appearance when they are resampled. Since the view is not being re-rendered from scratch, the view can be modified relatively quickly (e.g., at 200 Hz). In particular embodiments, the first computing system may be relatively powerful when compared to the second computing system, because the second computing system (e.g., a HMD) may have limited system resources that may not appreciably be increased without resulting in too much weight, size, and/or heat for the user's comfort.

Figure 2:
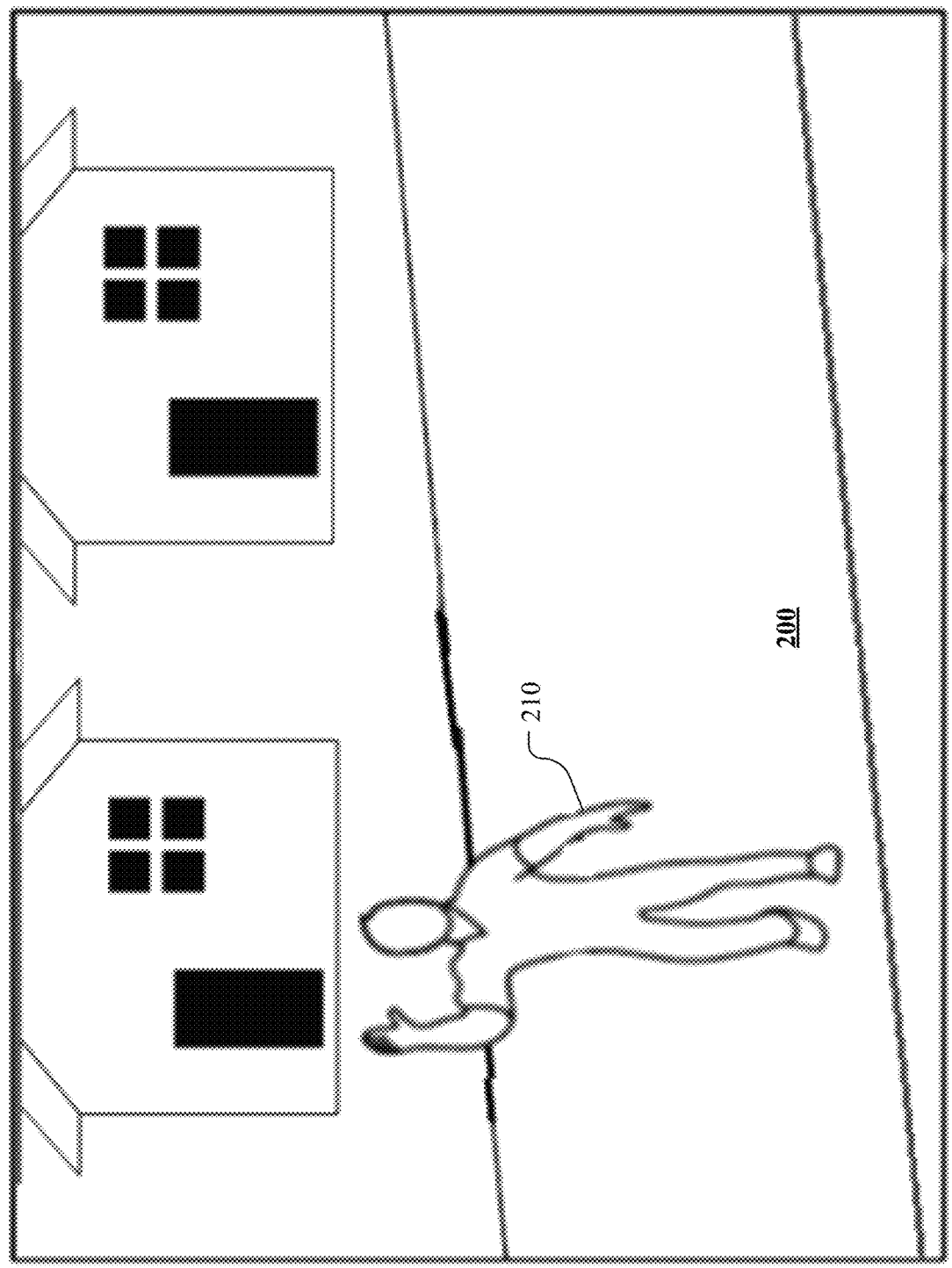
FIG. 2 illustrates an image of a real environment captured by one or more cameras associated with an artificial reality system.

In particular embodiments a sentry module within the computing system may continuously receive and classify image of a real environment captured by one or more cameras to detect objects of interests in an image of a real environment. The images may be captured by one or more cameras associated with the artificial reality system, for example cameras 105A-B on the HMD worn by the user. FIG. 2 illustrates an image 200 of a real environment captured by one or more cameras associated with an artificial reality system. The image 200 may include one or more objects of interest, for example human 210. In particular embodiments image 200 may be a monocular image at a lower resolution and framerate (e.g., 640×640 monochromatic images, alternating between left and right cameras, at 20 Hz), solely designed to detect dynamic objects within a user's field of view. By using a lower resolution image to detect dynamic objects substantial power savings are achieved as these frames consumed are already being utilized by the SLAM (simultaneous location and mapping) subsystem. Upon receiving image 200, a sentry module may determine that a portion of the image 200 contains one or more objects of interest 210, (e.g., a human) and classify the image based on this determination. In particular embodiments the computing system may utilize a machine learning model, comprising one or more neural networks, to detect objects of interest.

For example, a machine-learning model may be configured to receive as input an image 200 or a preprocessed representation of the image, such as a three-dimensional matrix with dimensions corresponding to the image's height, width, and color channels (e.g., red, green, and blue). The machine-learning model is configured to extract features of the image, for example object of interest 210 such as a human, and output, for example and not by way of limitation, an object detection indicator (e.g., a bounding box surrounding a person), one or more keypoints (e.g., representing the pose of a detected person), and/or a segmentation mask (e.g., identifying pixels that correspond to the detected person). These processes may be performed by one or more neural networks comprising a machine learning model. The machine-learning model's architecture is designed to be compact (thereby reducing storage and memory needs) and with reduced complexities (thereby reducing processing needs) so that it may produce sufficiently accurate and fast results on devices with limited resources to meet the demands of real-time applications (e.g., 10, 15, or 30 frames per second). Compared to conventional architectures, such as those based on ResNet or Feature Pyramid Networks (FPN), the architecture of the machine-learning model is much smaller in size and could generate predictions much faster (e.g., roughly 100× faster).

In particular embodiments, the machine-learning model includes several high-level components, including a backbone neural network, also referred to as a trunk, a region proposal network (RPN), a detection head (e.g., a people detector), a keypoint head, and a segmentation head. Each of these components may be configured as a neural network, such that the machine learning model comprises one or more neural networks. Conceptually, the trunk is configured to process an input image 200 and prepare a feature map (e.g., an inception of convolutional outputs) that represents the image 200. The RPN takes the feature map generated by the trunk and outputs N number of proposed regions of interest (RoIs) that may include one or more detected objects of interest 200, such as people, cars, or any other types of object of interest. The detection head may then detect which of the NRoIs are likely to contain the object of interest(s) of interest and output corresponding object detection indicators, which may define a smaller region, such as a bounding box, of the image 200 that contains the object of interest. In particular embodiments, a bounding box may be the smallest or near smallest rectangle (or any other geometric shape(s)) that is able to fully contain the pixels of the object of interest. For the RoIs deemed to be sufficiently likely to contain the object of interest, which may be referred to as target region definitions, the keypoint head may determine their respective keypoint mappings and the segmentation head may determine their respective segmentation masks. In particular embodiments, the detection head, keypoint head, and segmentation head may perform their respective operations in parallel. In other embodiments, the detection head, keypoint head, and segmentation head may not perform their operations in parallel but instead adopt a multi-staged processing approach, which has the advantage of reducing computation and speeding up the overall operation.

As described, the machine-learning model according to particular embodiments is compact and optimized for inference-time speed. Such optimizations may, in certain circumstances, result in the accuracy of the prediction results to be less than optimal. To compensate, particular embodiments may perform post-processing to correct or adjust the model's predictions. In particular, the keypoints predictions generated by the keypoint head may be automatically corrected based on a pose model. At a high level, the pose model may learn the poses that humans are likely to make. Using the post model, the keypoints predictions generated by the keypoint head may be automatically adjusted to reflect the more likely poses that the pose model has learned.

Figure 3A:
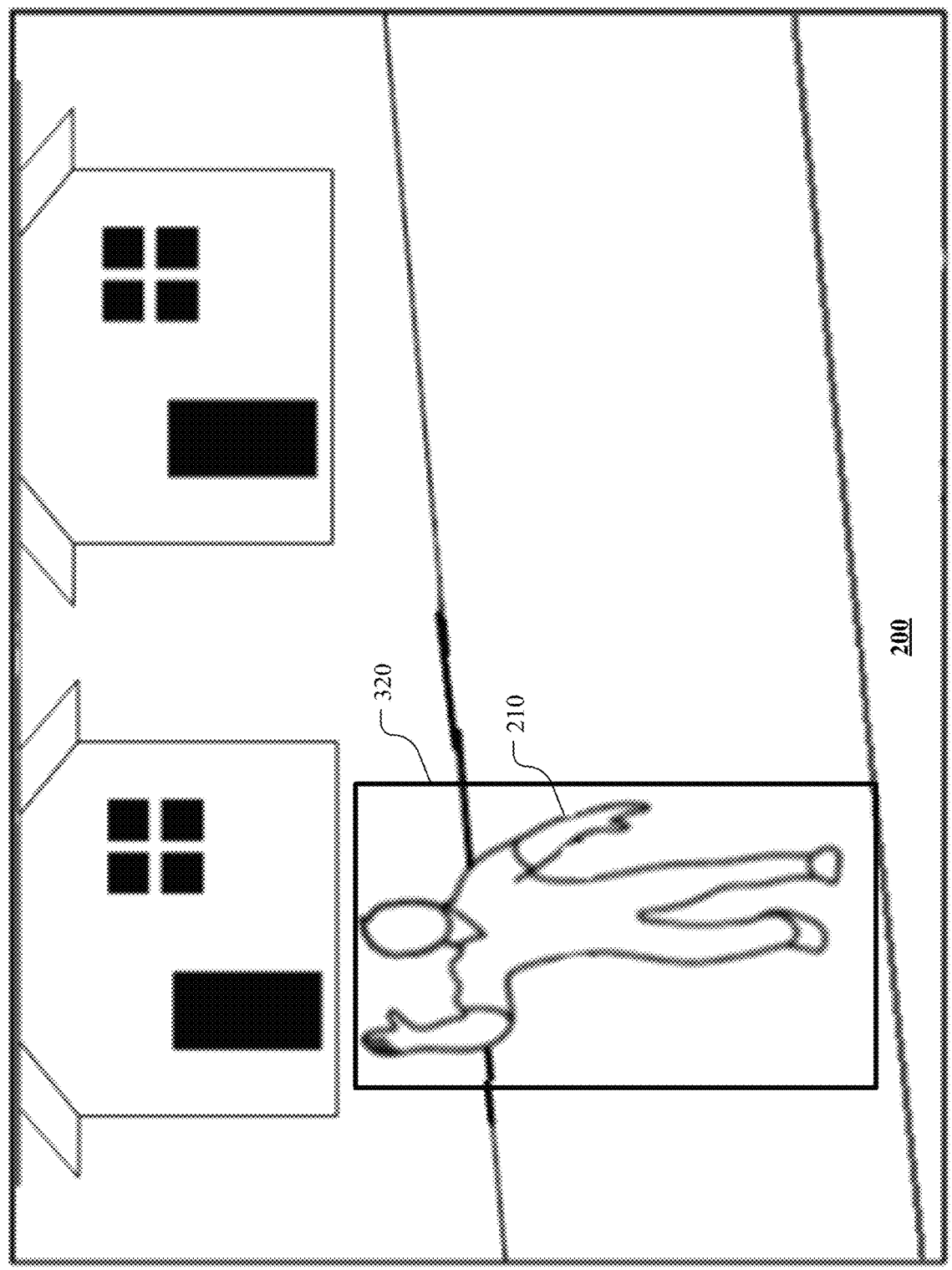
FIG. 3A illustrates a bounding box outputted based on a detected instance of an object of interest, such as a human.
Figure 3B:
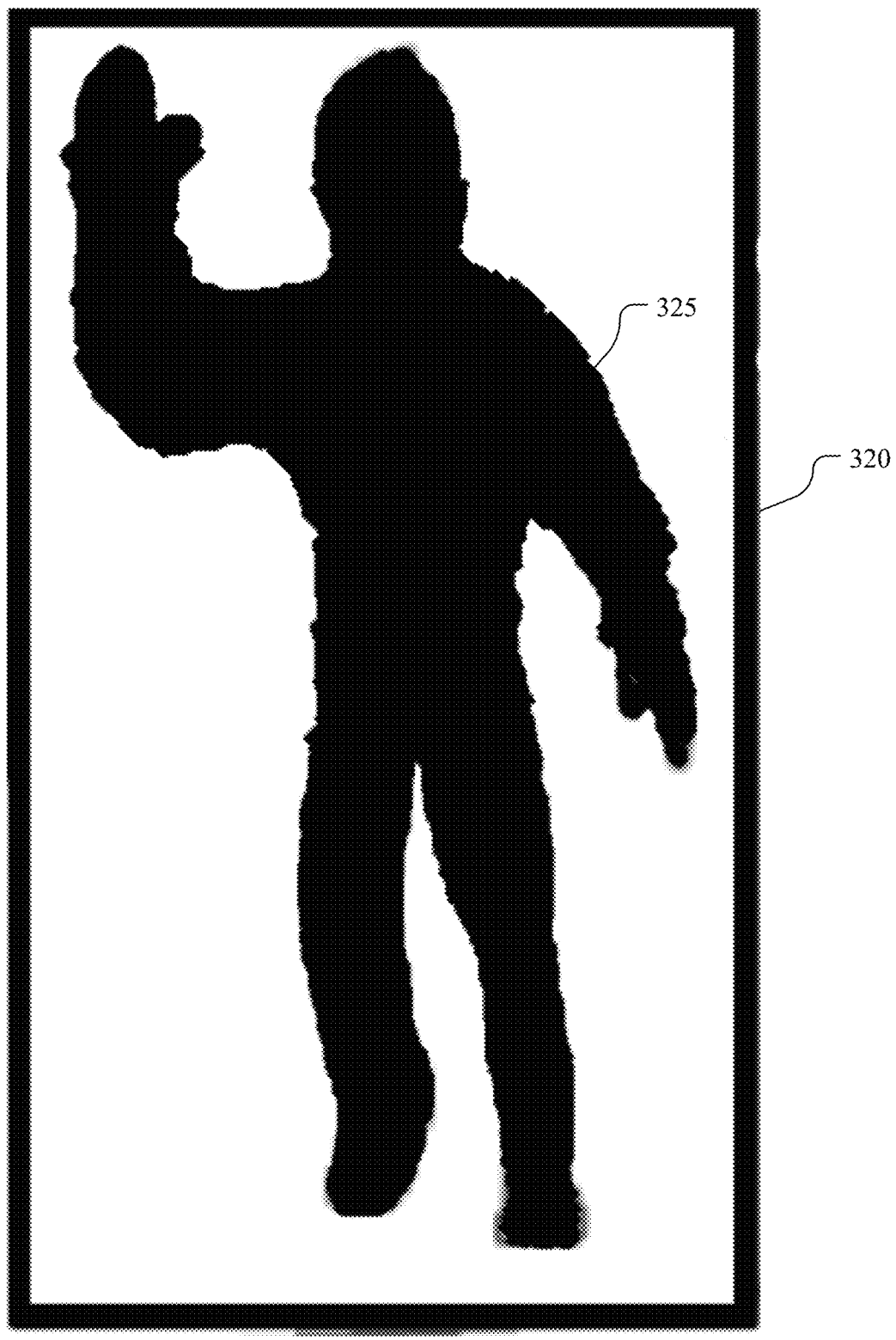
FIG. 3B illustrates a segmentation mask generated to represent a detected object of interest in an image of a real environment.

In particular embodiments, the machine-learning model may generate a bounding box that surrounds a detected object of interest 210, such as a human. FIG. 3A illustrates a bounding box outputted based on a detected instance of an object of interest, such as a human. A rectangular bounding box 320 may be represented as four two-dimensional coordinates that indicate the four corners of the box. Upon determining an object of interest 210 is present, a detector uses for example, a machine learning model (e.g., Mask R-CNN) to generate a 2D bounding box 320 comprising the object of interest 210 in the image 200. In particular embodiments, the machine-learning model may additionally or alternatively output a segmentation mask that identifies the particular pixels that belong to the detected instance. FIG. 3B illustrates a segmentation mask generated to represent a detected object of interest 210 in an image 200 of a real environment. For example, the segmentation mask 325 may be represented as a two-dimensional matrix, with each matrix element corresponding to a pixel of the image and the element's value corresponding to whether the associated pixel belongs to the detected person. In particular embodiments, a machine-learning model may additionally or alternatively map keypoints to the detected person's structure. The keypoints may map to the detected person's shoulders, elbows, wrists, hands, hips, knees, ankles, feet, neck, jaw bones, or any other joints or structures of interest. In particular embodiments, each keypoint may be represented as a two-dimensional coordinate, and the set of keypoints may be represented as an array or vector of coordinates. Although particular data representations for detected persons and segmentation information are described, this disclosure contemplates any suitable data representations of such information.

In particular embodiments, the computing system may generate, using the portion of the image that comprises the object of the interest, a surface that represents the object of interest 210 that are to be displayed within a view of an artificial reality environment. The surface may be based on the bounding box and/or the segmentation mask, and represent the object of interest 210 as it should appear within the view, and as such, may account for the user's perspective of the object from the view at the time the image was captured. A surface's texture data may be made up of one or more subparts, referred to herein as "texels." These texels may be blocks (e.g., rectangular blocks) that come together to create a texel array that makes up a surface. As an example and not by way of limitation, they may be contiguous blocks that make up a surface. For illustrative purposes, a texel of a surface may be conceptualized as being analogous to a pixel of an image. A surface may be generated by any suitable device. In particular embodiments, the surface may encode for visual information (RGBA) (e.g., as a texture) for one or more of its texels. The alpha component may be a value that specifies a level of transparency that is to be accorded to a texel. As an example and not by way of limitation, an alpha value of 0 may indicate that a texel is fully transparent, an alpha value of 1 may indicate that a texel is opaque, and alpha values in between may indicate a transparency level that is in between (the exact transparency level being determined by the value). A surface may support any suitable image format. To conserve resources, the surface may be transmitted as an alpha-mask that represents the occlusion and blending (e.g., transparency) of each pixel in the segmentation mask. The alpha-mask may be a low resolution texture (64×64 pixel), which reduces power consumption, provides for fuzzy (but aesthetically pleasing) borders when overlaid on an occluding object of interest 210, reduces latency due to smaller resolution, and provides for better scalability (e.g., to account for multiple people, crowds, etc. in an image).

In particular embodiments, the computing system may receive one or more depth measurements of the real environment corresponding to the portion of the image comprising the object of interest. In particular embodiments the depth measurements may be sparse depth measurements. The depth measurements may be determined in a variety of ways, for example based on stereo images and triangulation techniques, as the same objects in the real environment may be captured by both cameras 105A-B at the same time. In particular embodiments these techniques may determine depth measurements to one or more points on the object of interest 210, which may result in varying depth measurements for the object of interest 210. For example, if the detected object of interest 210 is a human pointing at the user in the image 200, the depth measurement of the pointing hand of the human may be less than the determined depth measurement of the head of detected human. Although this disclosure describes certain techniques for estimating the depth measurements in the real-environment, it should be appreciated that any suitable techniques for determining depth measurements utilizing images of a real environment and/or sensor data from an artificial reality system can be utilized.

Using these one or more depth measurements, the computing system can determine and assign a depth to the surface representing the object of interest 210 in image 200, for example the human as illustrated in FIG. 2. The depth of the surface may be a singular value representing the distance from the camera that captured image 200 to the detected object of interest 210 in the real environment. In particular embodiments, only a single depth of the surface may be assigned to the detected object of interest 210 in the image 200. Although different portions of detected object of interest 210 may have multiple depth measurements as previously described, assigning only one depth of the surface value to the detected object of interest 210 conserves computing resources for posing and rendering a surface representing the detected object of interest 210 in the artificial reality environment without depreciable loss in the immersive-ness of the artificial reality environment. To determine a single depth of the surface, in particular embodiments the computing system may receive all depth measurements measured for the detected object of interest 210, determine and remove one or more outliers from the received depth measurements, and create a histogram of the remaining depth values. In particular embodiments the depth of the surface representing the object of interest 210 may be the most frequently observed bin in the histogram. As another example, in some embodiments the depth of the surface representing the object of interest 210 may be determined by calculating a maximum, minimum, average, median, or certain percentile (e.g., 957 percentile) value among all depth measurements for the detected object of interest 210.

In particular embodiments, the surface may be posed in a coordinate system corresponding to the real environment, for example known world-locked coordinates (x, y), based on the and the depth of the surface representing the object of interest 210. The world-coordinates of the surface may be based on an absolute coordinate in the artificial reality environment (e.g., at a particular x, y coordinate), or the world-coordinates of the surface may be determined relative to the pose of the HMD, the HMD, one or more other surface or virtual objects in the artificial reality (e.g., posed at a coordinate relative to a wall or virtual coffee table in the artificial reality environment). The depth of the surface representing the object of interest 210 permits the computing system to pose the surface in the artificial reality environment relative to, for example and not by way of limitation, one or more other real objects or virtual objects in the environment. In this manner, proper occlusion of the detected object of interest 210 relative to the one or more other real objects or virtual objects can be determined, for example by occluding a portion of the surface representing a virtual object in the scene if the detected object of interest 210 passes in front of the virtual object. In particular embodiments, the computing system may identify, based on this pose of the surface and/or object of interest 210 in the world-coordinate domain, one or more regions of interest (ROIs) to the cameras 105A-B, such that in subsequent iterations only portions of images are sent to the detection module to save bandwidth and resources (e.g., the module may scan and classify the ROI's for each frame (e.g., 60 fps), but only scan and classify the entire received image at a lesser frequency (e.g., 10 fps)).

While the embodiments disclosed describe generating two-dimensional bounding boxes, segmentation masks, and 2.5D surfaces to represent detected object of interests using the image data, it should be appreciated that particular embodiments may permit the computing system to detect and represent one or more object of interests 210 (e.g., humans) in three-dimensions using, for example, bounding volumes and three-dimensional segmentation techniques (e.g., 3D Mask R-CNN).

For example, the computing system may receive a rough three-dimensional mesh of a scene generated based on one or more three-dimensional depth measurements (e.g., sparse depth measurements) of the scene, which could include for example one or more detected object of interests 210. The computing system may also receive a two-dimensional segmentation mask of the detected object of interests 210 that are extracted from an image outputted by, for example, a machine learning model. In particular embodiments the 3D mesh of the scene and extracted 2D segmentation mask are both defined relative to the same viewpoint, such that the 2D segmentation mask is projected and mapped to the 3D mesh. The 3D mesh is projected onto a 2D image plane of a camera positioned at the viewpoint of the user, resulting in the triangles of the 3D mesh being projected to a flat 2D plane. The projected triangles of the 3D mesh could then be compared to the 2D segmentation mask, using for example, a machine learning model, to determine where the object of interest 200 is located. In particular embodiments this is done by determining which triangles belong to the corresponding detected object of interest and which belong to other real objects or components of the real environment. The corresponding triangles in the 3D mesh can then be updated to encode which triangles belong to the detected object of interest (essentially creating a cutout of the 3D mesh), which could then be used to determine occlusion. In this way, detected object of interests 210 can be posed as a 3D mesh in the 3D environment (rather than a 2.5D representation) and assigned a transparency value (e.g., as opaque) that can be used in conjunction with traditional ray tracing techniques as described herein. In particular embodiments rendering a 3D mesh representing the object of interest (rather than a 2.5D surface) permits the computing system to display more aesthetically pleasing and textured depictions of detected object of interest 210, at the expense of computing resources (e.g., power, bandwidth, etc.).

Figure 4:
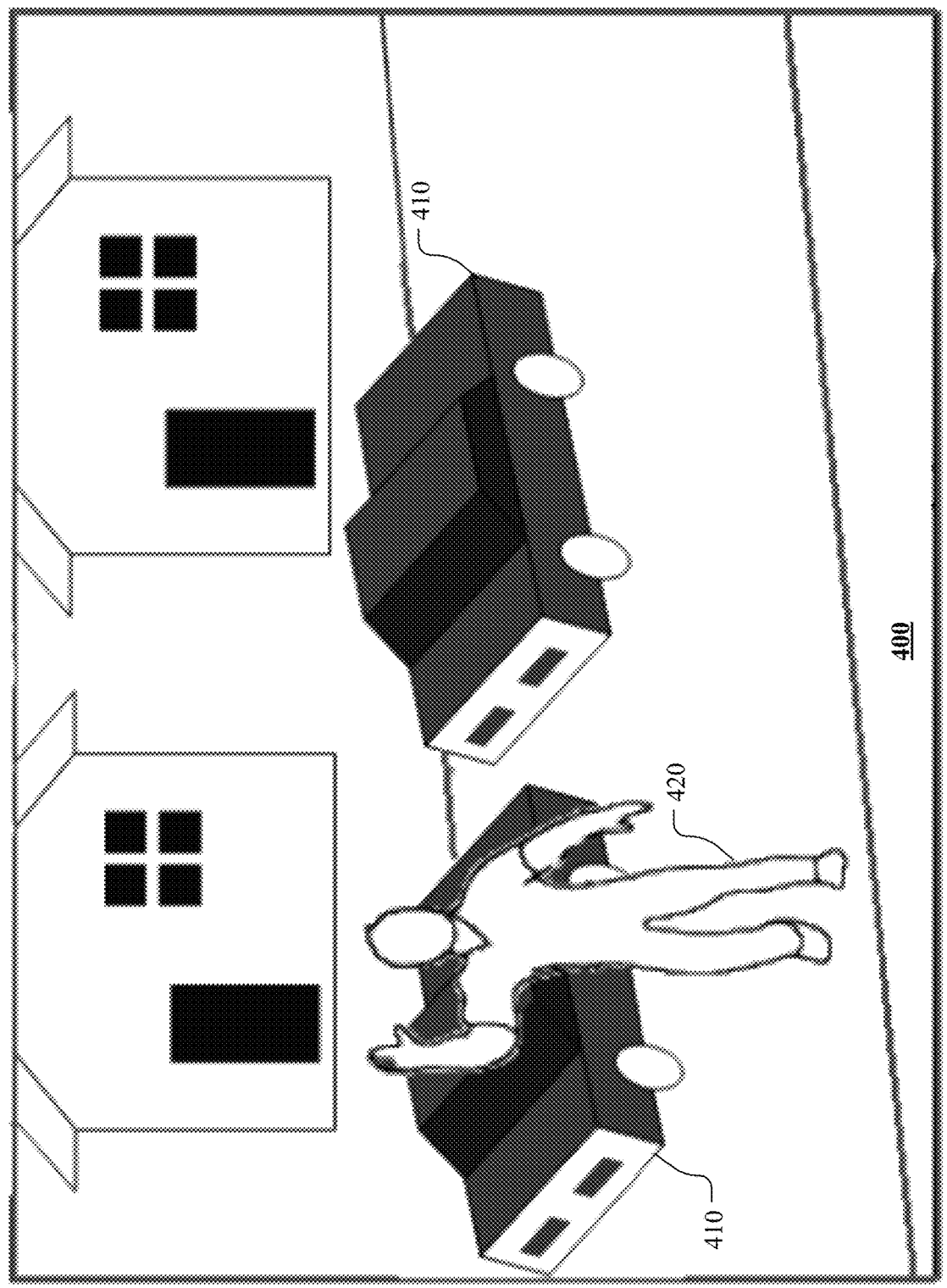
FIG. 4 illustrates a view of a rendered artificial reality environment that includes one or more surfaces.

In particular embodiments, a computing system may generate an initial output image of a view of a scene of an artificial reality environment for display to a user that may include for example, one or more surfaces representing one or more detected object of interests 210. FIG. 4 illustrates a view of a rendered artificial reality environment that includes one or more surfaces. As an example and not by way of limitation, this initial output image of a view may be a view of an AR artificial reality environment including a set of virtual objects 410 (or, as discussed elsewhere herein, a VR scene with virtual objects), for example a virtual car parked on the road, and one or more surfaces 420 representing object of interests 210. The computing system may utilize a ray-casting or other rendering process, such as ray tracing, for determining visual information and location information of one or more virtual objects that are to be displayed within a view of an artificial reality environment. In particular embodiments, the first computing system (e.g., a laptop, a cellphone, a desktop, a wearable device) may perform this first ray-casting process to render a view of an artificial reality environment. A "view" of an artificial reality environment may refer to a user perspective of the artificial reality environment, which may, for example, be determined based on a current position and orientation of an HMD. This use of the ray-casting process may be referred to herein as a "visibility test," because it may be used to determine a visibility of a virtual object 410 relative to the object of interest 210 by comparing a model of the virtual object with the surface. The ray-casting process may ultimately be used to associate pixels of the screen with points of intersection on any objects that would be visible for a view of an artificial reality environment.

In particular embodiments, the generated view may be rendered by one or more components (e.g., CPU, GPU, etc.) of the computing system physically connected to the HMD. However, the HMD may have limited system resources and a limited power supply, and these limitations may not be appreciably reduced without resulting in too much weight, size, and/or heat for the user's comfort. As a result, it may not be feasible for the HMD to unilaterally handle all the processing tasks involved in rendering a view. In particular embodiments, the one or more components may be associated with a device (e.g., a laptop, a cellphone, a desktop, a wearable device) that may be used to render the initial view (e.g., perform the ray-casting process). In particular embodiments, the device is in communication with a computing system on the HMD but may be otherwise physically separated from the HMD. As an example and not by way of limitation, this device may be a laptop device that is wired to the HMD or communicates wirelessly with the HMD. As another example and not by way of limitation, the device may be a wearable (e.g., a device strapped to a wrist), handheld device (e.g., a phone), or some other suitable device (e.g., a laptop, a tablet, a desktop) that is wired to the HMD or communicates wirelessly with the HMD. In particular embodiments the device may send this initial view to the HMD for display.

In particular embodiments the components of the device that generated the initial view may also generate the one or more surfaces representing the object of interest for the view. As another example and not by way of limitation, an onboard computing system of an HMD may generate the one or more surfaces after it receives the initial view from a separate computing system (e.g., from a CPU or GPU of a wearable, handheld, or laptop device). In particular embodiments, there may be a predefined maximum number of surfaces that may be generated for a view (e.g., 16 surfaces) for efficiency purposes. Although this disclosure focuses on displaying a view to a user on an AR HMD, it contemplates displaying the scene to a user on a VR display or any other suitable device.

After rendering the initial view of the artificial reality environment, the computing system may need to make one or more adjustments to the view to accurately display the current pose of the one or more surfaces 420 to the user. The need for these adjustments is unique to displaying artificial reality through, for example, an AR HMD 110 that permits the user to simultaneously see-through and perceive the real environment around them. For example, because the user is experiencing the artificial reality environment in real-time, after performing the processes described herein to render the image of the artificial reality environment for display, the computing system may be roughly 100 milliseconds behind the current pose of the both the user's head (e.g., the HMD pose) and the current pose of the detected object of interest 210, resulting in a slightly different perspective that the initially rendered view. In contrast, when artificial reality is displayed to a user through a traditional display (e.g., a tablet or mobile device) or through a HMD that completely occludes the user's view of the real environment (e.g., the HMD depicted in FIG. 1A), the computing system can simply delay or lag the displayed images such that the displayed images match the time needed to render and display the one or more surfaces representing detected object of interests within the artificial reality environment (i.e., the entire scene is lagged to account for this processing time).

Thus, if there is significant latency in updating the view to reflect this change in perspective with an artificial reality environment that allows the user to perceive the real environment around them, the user may be able to perceive the latency, creating a sensory dissonance. To prevent this dissonance, what is displayed to the user may need to account for changes in user perspective at a very rapid rate. Moreover, this latency between the rendered image and the real environment as the user is experiencing it results in 6 degrees of freedom that must be predicted to accurately display the artificial reality environment to the user in real-time: 3 degrees of freedom representing the movement of the user's head during this latency period, and 3 degrees of freedom representing movement of the dynamic detected object 210 during this latency period. Moreover, re-rendering the entire artificial reality environment to account for these changes in perspective takes time. As an example and not by way of limitation, even with a powerful computing system frames may only be rendered in this way at 60 Hz, which means that any changes in perspective that occur within 1/60th of a second (e.g., from a rapid head movement) would not be captured by what is rendered and displayed. Moreover, re-rendering the entire view to account for these changes in perspective is a resource-intensive task that may involve performing a large number of "visibility tests." to obtain visual information (e.g., color and transparency information) to render the view.

To remedy any changes in perspective that may result from the movement of the user's head during this latency period, rather than re-render the entire view the computing system may adjust the pose of the surface representing object interest 210 for a particular view to efficiently deal with rendering views quickly. The adjustments may account for predicted changes (e.g., move/translate, skew, scale, distort, or otherwise change in appearance together) that result in a change in a user's perspective of the artificial reality environment (e.g., resulting from a HMD on a user's head moving to a different position and/or orientation), for example surface 420 representing object of interest 210.

In particular embodiments, one such shortcut for approximating changes to a view may involve resampling the surfaces within a view (rather than re-rendering the entire view). In particular embodiments, resampling may involve performing a second ray-casting process to determine an approximation of how surfaces may look from an adjusted perspective that may result from one or more movements of the user's head (and the HMD and cameras) during this latency period. The adjusted perspective may be based on the latest viewpoint, position, and orientation information from the HMD, which may be continuously or semi-continuously by the computing system (e.g., using inertial, optical, depth, and/or other sensors on the HMD or on a remote device tracking the HMD) to determine the perspective of the user wearing the HMD at any given time. In particular embodiments, the computing system may also continuously or semi-continuously track the eye position of the user (e.g., to adjust for distortions resulting from lenses of the HMD that may be dependent on the user's gaze). In particular embodiments the latest viewpoint may be further determined based on the user's gaze (e.g., as determined by eye tracking).

By focusing on just resampling a limited number of surfaces within a view (e.g., 16 surfaces), the view can be modified quickly—and sufficiently quickly to prevent or reduce user perception of latency. As an example and not by way of limitation, further second ray-casting processes may be performed every ½₀₀th of a second, to account for possible changes in perspective from a change in position or orientation of the HMD. In particular embodiments, an onboard computing system of an HMD may resample one or more of the surfaces by performing a ray-casting process to reflect the latest perspective of the user. If the perspective has changed since the previous ray-casting process, the imaginary rays may accordingly intersect with different points of the surface. Modifying the view based on resampling in this manner may only be an approximation of how the view is supposed to be altered by a change in perspective, and this approximation may only work for relatively small changes in perspective. But this may be all that is needed, because the purpose is to account for changes that happen in relatively short periods of time between when fully rendered frames are generated (e.g., on the order of a hundredth of a second). Essentially, it may be a temporary fix until a view can be re-rendered (e.g., by a more powerful computing system such as a wearable device). As an example and not by way of limitation, a more powerful computing system that may be separate from the HMD (e.g., a wearable device secured to the user's belt or waistline) may re-render the view from scratch every ⅟₆₀th of a second and may send these re-rendered views to the HMD device as they are rendered. In this example, the HMD device, in the time between receiving re-rendered views every ⅟₆₀th of a second, may on its own modify surfaces (e.g., every ½₀₀th of a second) to account for rapid changes in user perspective.

In particular embodiments, the ray-casting process may be performed separately for each eye of a user to account for slight changes in the viewpoint (e.g., based on the relative positions of the eyes). As an example and not by way of limitation, the first and second ray-casting processes may be performed for a screen associated with the left eye and for a screen associated with the right eye. These processes may run independently of each other and may even function out of sync with one another.

To remedy and adjust for one or more movements of the object of interest (i.e., the other 3 degrees of freedom described herein), the computing system may predict the pose of the detected object of interest 210 at a future time and subsequently resample the surface 420 in the artificial reality environment. This may be done using a t versus t−1 pose predictor (using known velocities, movements, motion vectors, or other physics-based predictive models to predict the detected human's movements) and applying this prediction a time t+1 to generate a future pose of the object of interest. For example, using a series of images of detected object of interest 210 at known times (e.g., at time t, t−1, t−2 . . . t−n), the computing system can track and determine the position, orientation, velocity, acceleration of the surface 420 using known techniques to predict a pose of the surface 420 at time t+1. As a practical example, if the computing system uses a series of images to determine that at time t, detected object of interest 210 is a human walking from left to right from the perspective of the user at a rate of 3 m/s, at time t+1, the computing system may predict a time t+1 a pose of surface 420 that is 3 meters to the right of the current pose of the surface at time t. Although this example depicts the time between images (and poses) as one second, it should be appreciated this prediction can be conducted at any known time interval to correspond with the rate of image capture. In other embodiments, the time adjusted pose prediction of the surface 420 can also be accomplished using machine learning models (neural network, LSTM, predictive networks, etc.).

The time-adjusted resampled pose (accounting for the 6 degrees of freedom described) of the surface may be transmitted to the HMD for display. The computing system may generate an output image based on the determined visibility of the virtual object. Generating the output image may be done on the GPU of the computing system by rendering a surface as viewed from user's current viewing position for display. Based on this information, the computing system may display the view accordingly on the HMD based on the relative occlusions determined based on the latest user head pose, and transparencies of the surfaces and/or virtual objects in the rendered view. The two-dimensional surfaces (which may be alpha masks) may be used to mask virtual content that should be occluded by real people. For example, returning to FIG. 4, if the surface 420 is located ahead of a portion of a virtual object 410 in the environment, the portion of virtual object 410 will not be displayed, as illustrated in FIG. 4. An immersive artificial reality environment may then be displayed accordingly to the user.

Figure 5:
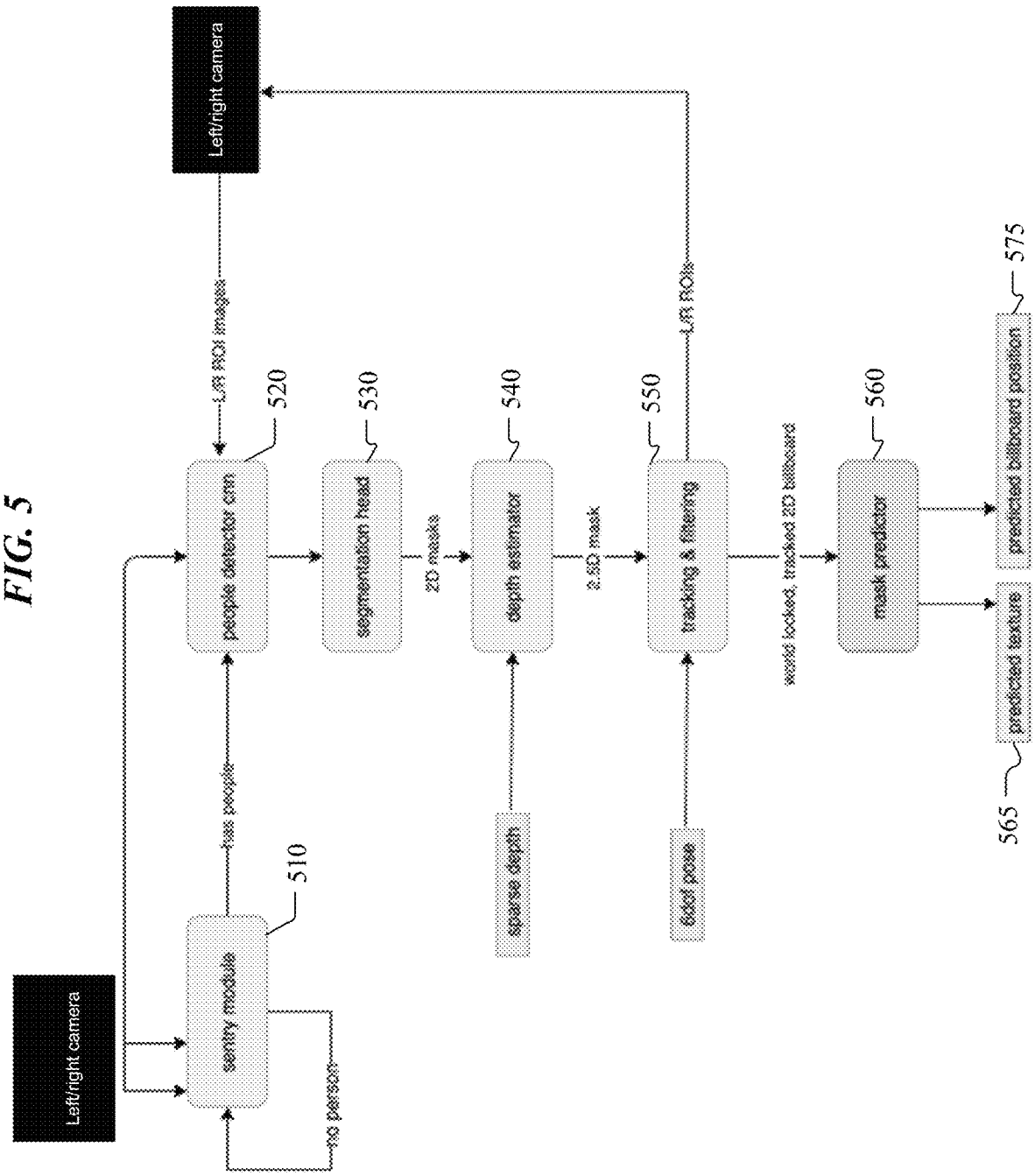
FIG. 5 illustrates a process pipeline for generating a pose of a surface in an artificial reality environment.

FIG. 5 illustrates a process pipeline for generating a pose of a surface in an artificial reality environment. The proposed pipeline offers several advantages. First, the flexibility of the pipeline permits it to be adapted to fit the needs of the computing system in which it is resident. For example, if system resources are abundant, multiple instances of various steps of the pipeline can be created to reduce latency (e.g., if multiple object of interests of interest are present in the image). If system resources are scarce, only one instance of the pipeline can be created and operated, at the cost of some amount of latency. Second, the pipeline can be augmented with additional process described herein, for example, a step that generates keypoints or a rudimentary skeletal model of the objects being tracked, potentially increasing forward prediction accuracy.

At step 510, the computing system associated with an artificial reality system receives an image of a real environment from one or more cameras associated with the artificial reality system. In particular embodiments the one or more images may be received from a left or right camera associated with an artificial reality system at a lower resolution (e.g., ⅛ the normal resolution) and framerate (e.g., 10 fps). Upon receiving the one or more images, a sentry module may classify the image based on whether one or more detected object of interests (e.g., a human, an animal, vehicle, etc.) are detected within the image. This determination may be made by a machine learning model or other appropriate computer vision technique. In particular embodiments, the module may be trained to identify a specific type of object (e.g., a human). If no object is detected in the received image, the process may return to step 610, where the module may continue to receive images of the real environment. In particular embodiments the module may continuously receive and classify images from cameras as the user of the artificial reality system experiences the artificial reality environment.

At step 520, upon detecting an object of interest of interest in the environment, the computing system may generate a bounding box that surrounds a detected instance of an object of interest, using for example a people detector convolutional neural network (e.g., mask R-CNN). A rectangular bounding box may be represented as four two-dimensional coordinates that indicate the four corners of the box.

At step 530, the computing system may additionally or alternatively output a segmentation mask that identifies the particular pixels that belong to the detected instance of the object of interest. Using the segmentation mask, the computing system may output a two-dimensional surface representing the detected object of interest that can be rendered and displayed in the artificial reality environment to represent the detected object of interest.

It should be noted that the generation of surfaces and their poses in space directly from a machine learning model (e.g., a neural network) is advantageous because it avoids any software or hardware rasterization and the contention or latency that comes with these solutions. Using traditional methods, a new texture would be generated and rasterized onto a mesh using the hardware GPU. By circumventing the GPU through the machine learning model, timing of this process becomes more deterministic and latency is decreased significantly.

At step 540, the computing system may further determine and assign a depth value to the surface representing the detected object of interest in the image. Depth may represent the distance from the HMD worn by the user to the detected object. In particular embodiments, only a single depth value may be assigned surface, even though a sparse depth map may provide different depth values for different portions of a detected object of interest. Assigning one depth value conserves computing resources for posing and rendering the surface in the artificial reality environment without depreciable loss in the immersive-ness of the artificial reality environment. The computing system may output a surface with known world-coordinates and depth information (i.e., a 2.5-dimensional surface) that can be rendered and displayed in the artificial reality environment. To conserve resources, the surface may be transmitted as an alpha-mask that represents the occlusion and blending (e.g., transparency) of each pixel in the segmentation mask.

At step 550, when an object of interest is detected, the computing system may track the location of the object within that image to determine one or more regions of interest. The region of interest may be determined based on the received image data, the user's field of view, and the current pose of the HMD. In particular embodiments the one or more regions of interest may be used by the computing system, such that in subsequent iterations of the pipeline only portions of images are sent to the machine learning models (e.g., the computing system may generate bounding boxes and segmentation masks using only the regions of interest as input for each image (e.g., which may be received at, for example, a lower resolution and framerate of 30 fps), but only generate bounding boxes and segmentation masks using the entire image as input at a lesser frequency (e.g., 10 fps)). Using only the regions of interest reduces the amount of data, and thus power, that will be used to track a person through the rest of the pipeline by reducing the size and area of the image that must be analyzed by the sentry module and machine learning model. For example, if the computing system determines a person is located in the top left quadrant of an image, the computing system may determine a region of interest in this quadrant and use this information such that the machine learning models only analyzes the top left quadrant in subsequent frames. In particular embodiments the region of interest sizes are optimized for the compression subsystem, in order to maximize system efficiency and minimize system power consumption. In particular embodiments each tracked person requires its own regions of interest.

At step 560, a mask predictor of the computing system may generate a pose of the surface that accounts for the latency required to perform the processes described herein to render the image of the artificial reality environment for display. These adjustments may account for final stage of the pipeline, before display, leverages the ability of a timewarp engine on the HMD to upsample and filter these masks appropriately for accurate world size. This innovation enables the tracking and mask generation pipeline to be built more efficiently. By only ever creating one size of mask texture, we eliminate any steps of scaling or reprojection, and instead create a bounded problem that utilizes efficient, purpose-built hardware modules designed to do these operations, saving power and complexity. By using a timewarp engine on the HMD, the GPU is bypassed which results in reduced latency and conserved resources. A timewarp engine on the HMD also allows for animation/rendering at a lower rate than it is displayed at.

Particular embodiments may repeat one or more steps of the process pipeline of FIG. 5, where appropriate. Although this disclosure describes and illustrates particular steps of the process pipeline of FIG. 5 as occurring in a particular order, this disclosure contemplates any suitable steps of the process pipeline of FIG. 6 occurring in any suitable order. Moreover, although this disclosure describes and illustrates an example process pipeline for generating a pose of a surface in an artificial reality environment including the particular steps of the process pipeline of FIG. 5, this disclosure contemplates any suitable process pipeline for generating a pose of a surface in an artificial reality environment including any suitable steps, which may include all, some, or none of the steps of the process pipeline of FIG. 5, where appropriate. Furthermore, although this disclosure describes and illustrates particular components, devices, or systems carrying out particular steps of the process pipeline of FIG. 5, this disclosure contemplates any suitable combination of any suitable components, devices, or systems carrying out any suitable steps of the process pipeline of FIG. 6.

Figure 6:
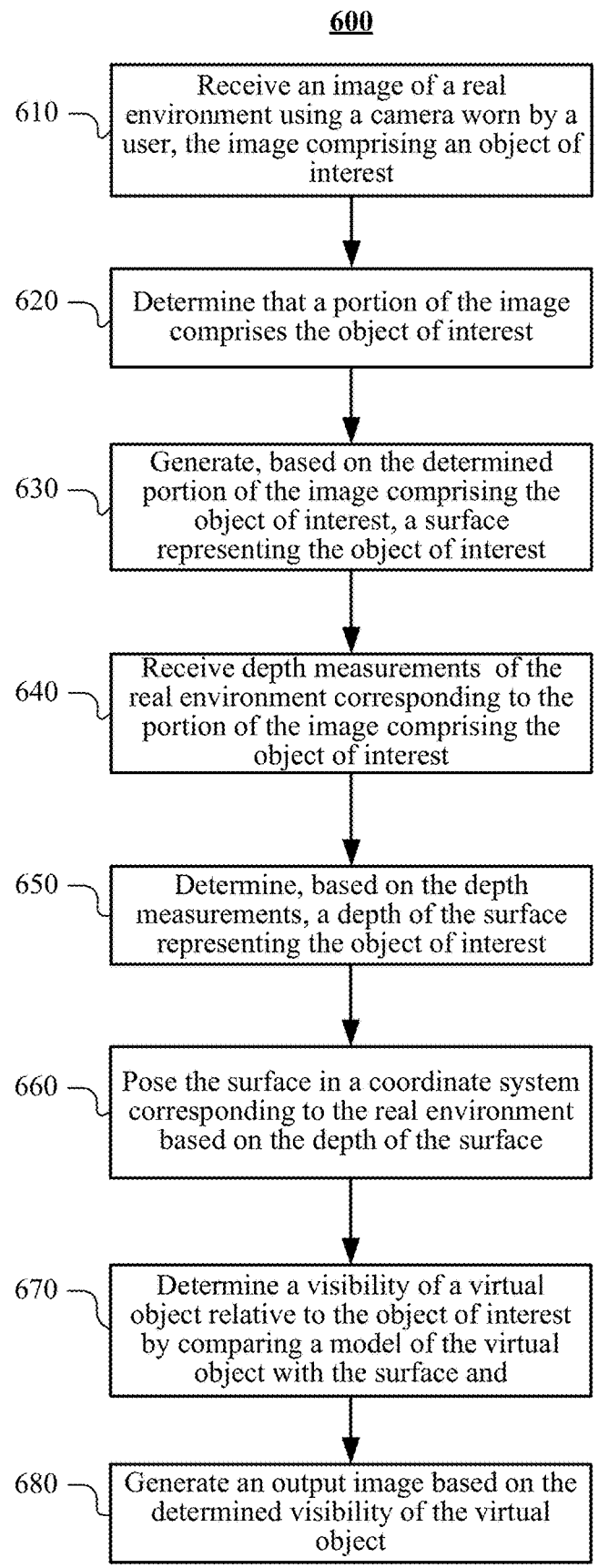
FIG. 6 illustrates an example method for generating an output image that includes a surface representing an object of interest.

FIG. 6 illustrates an example method 600 for generating an output image that includes a surface representing an object of interest. The method may begin at step 610, where a computing system receives an image of a real environment using a camera worn by a user, the image comprising an object of interest. In particular embodiments the images may be received by a sentry module within the computing system that continuously receives and classifies images. In particular embodiments the object of interest may be a dynamic object, such as a human, an animal, vehicle, etc. In particular embodiments the image may include multiple objects of interest (e.g., a crowd of people, a traffic jam with multiple vehicles, etc.)

At step 620, the computing system determines that a portion of the image comprises the object of interest. This determination may be made by a machine learning module or other appropriate computer vision technique. In particular embodiments, the module may be trained to identify a specific type of object (e.g., a human, animals, vehicles, etc.). In particular embodiments the machine learning module may output a bounding box or segmentation mask that corresponds to the regions of interest or the object of interest.

At step 630, the computing system generates, based on the determined portion of the image comprising the object of interest, a surface representing the object of interest. The surface may be based on the bounding box and/or the segmentation mask, and represent the object of interest as it should appear within the view, and as such, may account for the user's perspective of the object from the view at the time the image was captured. A surface's texture data may be made up of one or more subparts, referred to herein as "texels." In particular embodiments, the surface may encode for visual information (RGBA) (e.g., as a texture) for one or more of its texels. The alpha component may be a value that specifies a level of transparency that is to be accorded to a texel.

At step 640, the computing system receives depth measurements of the real environment corresponding to the portion of the image comprising the object of interest. The depth measurements may be determined in a variety of ways, for example based on stereo images and triangulation techniques. In particular embodiments these techniques may determine depth measurements to one or more points on the object of interest, which may result in varying depth measurements for the object of interest.

At step 650, the computing system determines, based on the depth measurements, a depth of the surface representing the object of interest. The depth of the surface may be a singular value representing the distance from the camera that captured image to the detected object of interest in the real environment. To determine a single depth of the surface, in particular embodiments the computing system may receive all depth measurements measured for the detected object of interest, determine and remove one or more outliers from the received depth measurements, and create a histogram of the remaining depth values. In particular embodiments the depth of the surface representing the object of interest may be the most frequently observed bin in the histogram.

At step 660, the computing system poses the surface in a coordinate system corresponding to the real environment based on the depth of the surface. The depth of the surface representing the object of interest permits the computing system to pose the surface in the artificial reality environment relative to, for example and not by way of limitation, one or more other real objects or virtual objects in the environment. The coordinate system may be world-locked coordinates based on an absolute coordinate in the artificial reality environment (e.g., at a particular x, y coordinate), or the world-coordinates of the surface may be determined relative to the pose of the HMD, the HMD, one or more other surface or virtual objects in the artificial reality (e.g., posed at a coordinate relative to a wall or virtual coffee table in the artificial reality environment).

At step 670, the computing system determines a visibility of a virtual object relative to the object of interest by comparing a model of the virtual object with the surface. The computing system may utilize a ray-casting or other rendering process, such as ray tracing, for determining visual information and location information of one or more virtual objects relative to the object of interest that are to be displayed within a view of an artificial reality environment.

At step 680, the computing system generates an output image based on the determined visibility of the virtual object. The output image may be a view of an AR artificial reality environment including a set of virtual objects 410 (or, as discussed elsewhere herein, a VR scene with virtual objects), for example a virtual car parked on the road, and one or more surfaces representing object of interests. The ray-casting process may ultimately be used to associate pixels of the screen with points of intersection on any objects that would be visible for a view of an artificial reality environment.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for generating an output image that includes a surface representing an object of interest including the particular steps of the method of FIG. 6, this disclosure contemplates any suitable method for generating an output image that includes a surface representing an object of interest including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
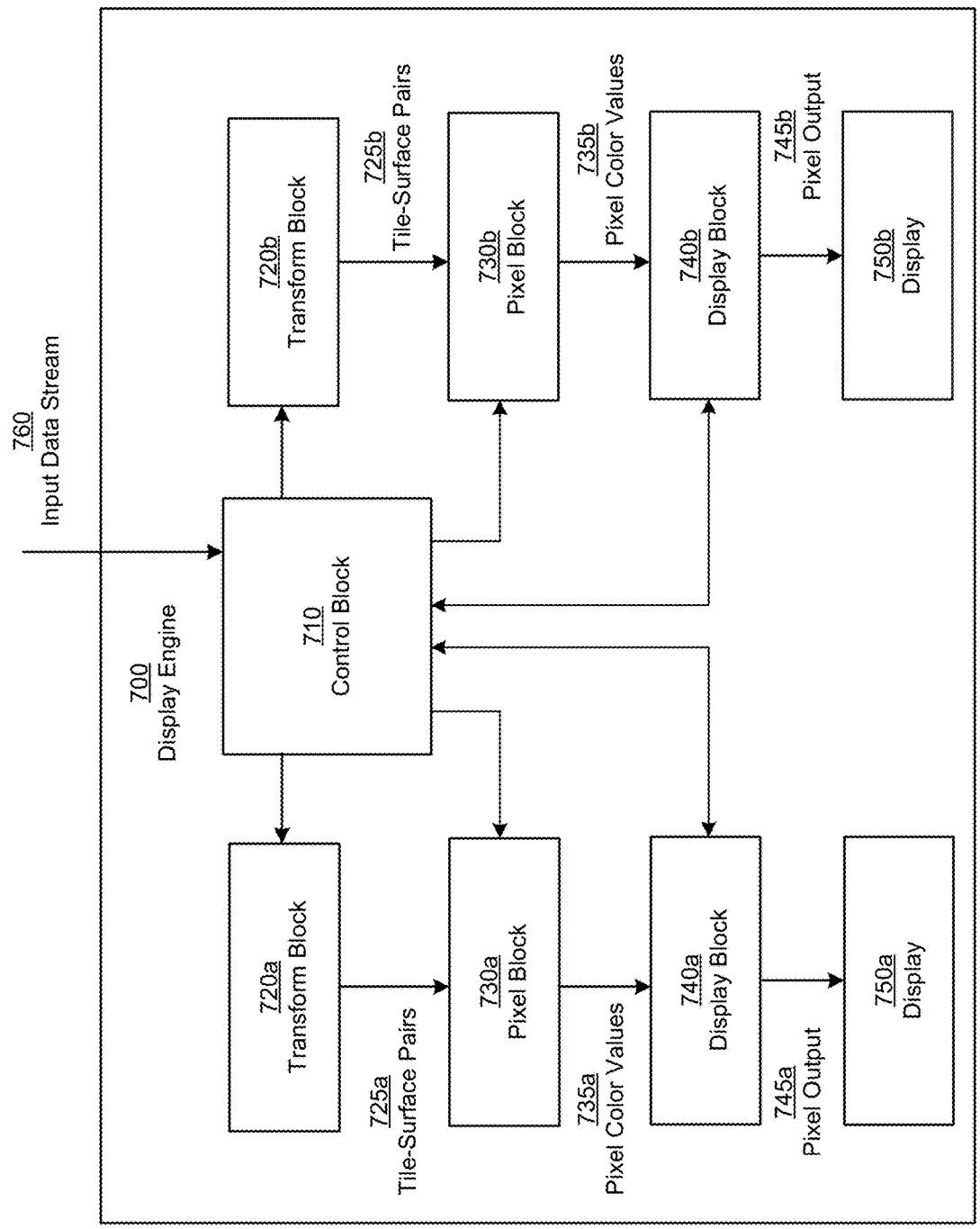
FIG. 7 illustrates a system diagram for a display engine 700.

FIG. 7 illustrates a system diagram for a display engine 700. The display engine 700 may comprise four types of top level blocks. As shown in FIG. 7, these blocks may include a control block 710, transform blocks 720a and 720b, pixel blocks 730a and 730b, and display blocks 740a and 740b. One or more of the components of the display engine 700 may be configured to communicate via one or more high-speed bus, shared memory, or any other suitable method. As shown in FIG. 7, the control block 710 of display engine 700 may be configured to communicate with the transform blocks 720a and 720b and pixel blocks 730a and 730b. Display blocks 740a and 740b may be configured to communicate with the control block 710. As explained in further detail herein, this communication may include data as well as control signals, interrupts and other instructions.

In particular embodiments, the control block 710 may receive an input data stream 760 from a primary rendering component and initialize a pipeline in the display engine 700 to finalize the rendering for display. In particular embodiments, the input data stream 760 may comprise data and control packets from the primary rendering component. The data and control packets may include information such as one or more surfaces comprising texture data and position data and additional rendering instructions. The control block 710 may distribute data as needed to one or more other blocks of the display engine 700. The control block 710 may initiate pipeline processing for one or more frames to be displayed. In particular embodiments, a HMD may comprise multiple display engines 700 and each may comprise its own control block 710.

In particular embodiments, transform blocks 720a and 720b may determine initial visibility information for surfaces to be displayed in the view of the artificial reality environment. In general, transform blocks (e.g., the transform blocks 720a and 720b) may cast rays from pixel locations on the screen and produce filter commands (e.g., filtering based on bilinear or other types of interpolation techniques) to send to pixel blocks 730a and 730b. Transform blocks 720a and 720b may perform ray casting from the current viewpoint of the user (e.g., determined using inertial measurement units, eye trackers, and/or any suitable tracking/localization algorithms, such as simultaneous localization and mapping (SLAM)) into the artificial scene where surfaces are positioned and may produce results to send to the respective pixel blocks (730a and 730b).

In general, transform blocks 720a and 720b may each comprise a four-stage pipeline, in accordance with particular embodiments. The stages of a transform block may proceed as follows. A ray caster may issue ray bundles corresponding to arrays of one or more aligned pixels, referred to as tiles (e.g., each tile may include 16×16 aligned pixels). The ray bundles may be warped, before entering the artificial reality environment, according to one or more distortion meshes. The distortion meshes may be configured to correct geometric distortion effects stemming from, at least, the displays 750a and 750b of the HMD. Transform blocks 720a and 720b may determine whether each ray bundle intersects with surfaces in the artificial reality environment by comparing a bounding box of each tile to bounding boxes for each surface. If a ray bundle does not intersect with an object, it may be discarded. Tile-surface intersections are detected, and corresponding tile-surface pair 725a and 725b are passed to pixel blocks 730a and 730b.

In general, pixel blocks 730a and 730b determine color values from the tile-surface pairs 725a and 725b to produce pixel color values, in accordance with particular embodiments. The color values for each pixel are sampled from the texture data of surfaces received and stored by the control block 710 (e.g., as part of input data stream 760). Pixel blocks 730a and 730b receive tile-surface pairs 725a and 725b from transform blocks 720a and 720b, respectively, and schedule bilinear filtering. For each tile-surface pair 725a and 725b, pixel blocks 730a and 730b may sample color information for the pixels within the tile using color values corresponding to where the projected tile intersects the surface. In particular embodiments, pixel blocks 730a and 730b may process the red, green, and blue color components separately for each pixel. Pixel blocks 730a and 730b may then output pixel color values 735a and 735b, respectively, to display blocks 740a and 740b.

In general, display blocks 740a and 740b may receive pixel color values 735a and 735b from pixel blocks 730a and 730b, converts the format of the data to be more suitable for the scanline output of the display, apply one or more brightness corrections to the pixel color values 735a and 735b, and prepare the pixel color values 735a and 735b for output to the displays 750a and 750b. Display blocks 740a and 740b may convert tile-order pixel color values 735a and 735b generated by pixel blocks 730a and 730b into scanline- or row-order data, which may be required by the displays 750a and 750b. The brightness corrections may include any required brightness correction, gamma mapping, and dithering. Display blocks 740a and 740b may provide pixel output 745a and 745b, such as the corrected pixel color values, directly to displays 750a and 750b or may provide the pixel output 745a and 745b to a block external to the display engine 700 in a variety of formats. For example, the HMD may comprise additional hardware or software to further customize backend color processing, to support a wider interface to the display, or to optimize display speed or fidelity.

Figure 8:
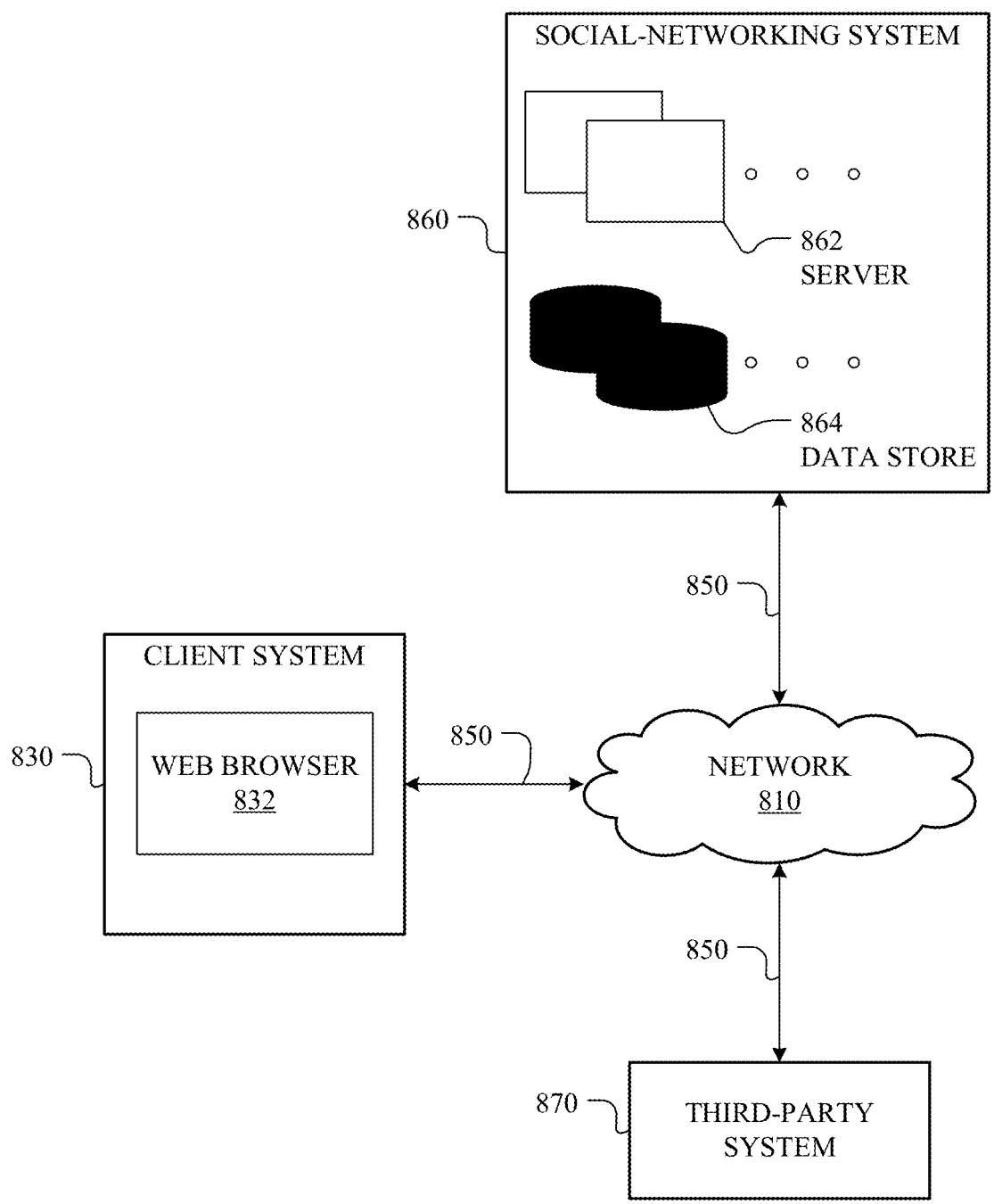
FIG. 8 illustrates an example network environment associated with a social-networking system.

FIG. 8 illustrates an example network environment 800 associated with a social-networking system. Network environment 800 includes a client system 830, a social-networking system 860, and a third-party system 870 connected to each other by a network 810. Although FIG. 8 illustrates a particular arrangement of client system 830, social-networking system 860, third-party system 870, and network 810, this disclosure contemplates any suitable arrangement of client system 830, social-networking system 860, third-party system 870, and network 810. As an example and not by way of limitation, two or more of client system 830, social-networking system 860, and third-party system 870 may be connected to each other directly, bypassing network 810. As another example, two or more of client system 830, social-networking system 860, and third-party system 870 may be physically or logically co-located with each other in whole or in part. Moreover, although FIG. 8 illustrates a particular number of client systems 830, social-networking systems 860, third-party systems 870, and networks 810, this disclosure contemplates any suitable number of client systems 830, social-networking systems 860, third-party systems 870, and networks 810. As an example and not by way of limitation, network environment 800 may include multiple client system 830, social-networking systems 860, third-party systems 870, and networks 810.

This disclosure contemplates any suitable network 810. As an example and not by way of limitation, one or more portions of network 810 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 810 may include one or more networks 810.

Links 850 may connect client system 830, social-networking system 860, and third-party system 870 to communication network 810 or to each other. This disclosure contemplates any suitable links 850. In particular embodiments, one or more links 850 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 850 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 850, or a combination of two or more such links 850. Links 850 need not necessarily be the same throughout network environment 800. One or more first links 850 may differ in one or more respects from one or more second links 850.

In particular embodiments, client system 830 may be an electronic device including hardware, software, or embedded logic components or a combination of two or more such components and capable of carrying out the appropriate functionalities implemented or supported by client system 830. As an example and not by way of limitation, a client system 830 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 830. A client system 830 may enable a network user at client system 830 to access network 810. A client system 830 may enable its user to communicate with other users at other client systems 830.

In particular embodiments, client system 830 may include a web browser 832, and may have one or more add-ons, plug-ins, or other extensions. A user at client system 830 may enter a Uniform Resource Locator (URL) or other address directing the web browser 832 to a particular server (such as server 862, or a server associated with a third-party system 870), and the web browser 832 may generate a Hyper Text Transfer Protocol (HTTP) request and communicate the HTTP request to server. The server may accept the HTTP request and communicate to client system 830 one or more Hyper Text Markup Language (HTML) files responsive to the HTTP request. Client system 830 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 860 may be a network-addressable computing system that can host an online social network. Social-networking system 860 may generate, store, receive, and send social-networking data, such as, for example, user-profile data, concept-profile data, social-graph information, or other suitable data related to the online social network. Social-networking system 860 may be accessed by the other components of network environment 800 either directly or via network 810. As an example and not by way of limitation, client system 830 may access social-networking system 860 using a web browser 832, or a native application associated with social-networking system 860 (e.g., a mobile social-networking application, a messaging application, another suitable application, or any combination thereof) either directly or via network 810. In particular embodiments, social-networking system 860 may include one or more servers 862. Each server 862 may be a unitary server or a distributed server spanning multiple computers or multiple datacenters. Servers 862 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 862 may include hardware, software, or embedded logic components or a combination of two or more such components for carrying out the appropriate functionalities implemented or supported by server 862. In particular embodiments, social-networking system 860 may include one or more data stores 864. Data stores 864 may be used to store various types of information. In particular embodiments, the information stored in data stores 864 may be organized according to specific data structures. In particular embodiments, each data store 864 may be a relational, columnar, correlation, or other suitable database. Although this disclosure describes or illustrates particular types of databases, this disclosure contemplates any suitable types of databases. Particular embodiments may provide interfaces that enable a client system 830, a social-networking system 860, or a third-party system 870 to manage, retrieve, modify, add, or delete, the information stored in data store 864.

In particular embodiments, social-networking system 860 may store one or more social graphs in one or more data stores 864. In particular embodiments, a social graph may include multiple nodes—which may include multiple user nodes (each corresponding to a particular user) or multiple concept nodes (each corresponding to a particular concept)—and multiple edges connecting the nodes. Social-networking system 860 may provide users of the online social network the ability to communicate and interact with other users. In particular embodiments, users may join the online social network via social-networking system 860 and then add connections (e.g., relationships) to a number of other users of social-networking system 860 to whom they want to be connected. Herein, the term "friend" may refer to any other user of social-networking system 860 with whom a user has formed a connection, association, or relationship via social-networking system 860.

In particular embodiments, social-networking system 860 may provide users with the ability to take actions on various types of items or objects, supported by social-networking system 860. As an example and not by way of limitation, the items and objects may include groups or social networks to which users of social-networking system 860 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 860 or by an external system of third-party system 870, which is separate from social-networking system 860 and coupled to social-networking system 860 via a network 810.

In particular embodiments, social-networking system 860 may be capable of linking a variety of entities. As an example and not by way of limitation, social-networking system 860 may enable users to interact with each other as well as receive content from third-party systems 870 or other entities, or to allow users to interact with these entities through an application programming interfaces (API) or other communication channels.

In particular embodiments, a third-party system 870 may include one or more types of servers, one or more data stores, one or more interfaces, including but not limited to APIs, one or more web services, one or more content sources, one or more networks, or any other suitable components, e.g., that servers may communicate with. A third-party system 870 may be operated by a different entity from an entity operating social-networking system 860. In particular embodiments, however, social-networking system 860 and third-party systems 870 may operate in conjunction with each other to provide social-networking services to users of social-networking system 860 or third-party systems 870. In this sense, social-networking system 860 may provide a platform, or backbone, which other systems, such as third-party systems 870, may use to provide social-networking services and functionality to users across the Internet.

In particular embodiments, a third-party system 870 may include a third-party content object provider. A third-party content object provider may include one or more sources of content objects, which may be communicated to a client system 830. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 860 also includes user-generated content objects, which may enhance a user's interactions with social-networking system 860. User-generated content may include anything a user can add, upload, send, or "post" to social-networking system 860. As an example and not by way of limitation, a user communicates posts to social-networking system 860 from a client system 830. Posts may include data such as status updates or other textual data, location information, photos, videos, links, music or other similar data or media. Content may also be added to social-networking system 860 by a third-party through a "communication channel," such as a newsfeed or stream.

In particular embodiments, social-networking system 860 may include a variety of servers, sub-systems, programs, modules, logs, and data stores. In particular embodiments, social-networking system 860 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 860 may also include suitable components such as network interfaces, security mechanisms, load balancers, failover servers, management-and-network-operations consoles, other suitable components, or any suitable combination thereof. In particular embodiments, social-networking system 860 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 860 to one or more client systems 830 or one or more third-party system 870 via network 810. The web server may include a mail server or other messaging functionality for receiving and routing messages between social-networking system 860 and one or more client systems 830. An API-request server may allow a third-party system 870 to access information from social-networking system 860 by calling one or more APIs. An action logger may be used to receive communications from a web server about a user's actions on or off social-networking system 860. In conjunction with the action log, a third-party-content-object log may be maintained of user exposures to third-party-content objects. A notification controller may provide information regarding content objects to a client system 830. Information may be pushed to a client system 830 as notifications, or information may be pulled from client system 830 responsive to a request received from client system 830. Authorization servers may be used to enforce one or more privacy settings of the users of social-networking system 860. A privacy setting of a user determines how particular information associated with a user can be shared. The authorization server may allow users to opt in to or opt out of having their actions logged by social-networking system 860 or shared with other systems (e.g., third-party system 870), such as, for example, by setting appropriate privacy settings. Third-party-content-object stores may be used to store content objects received from third parties, such as a third-party system 870. Location stores may be used for storing location information received from client systems 830 associated with users. Advertisement-pricing modules may combine social information, the current time, location information, or other suitable information to provide relevant advertisements, in the form of notifications, to a user.

Figure 9:
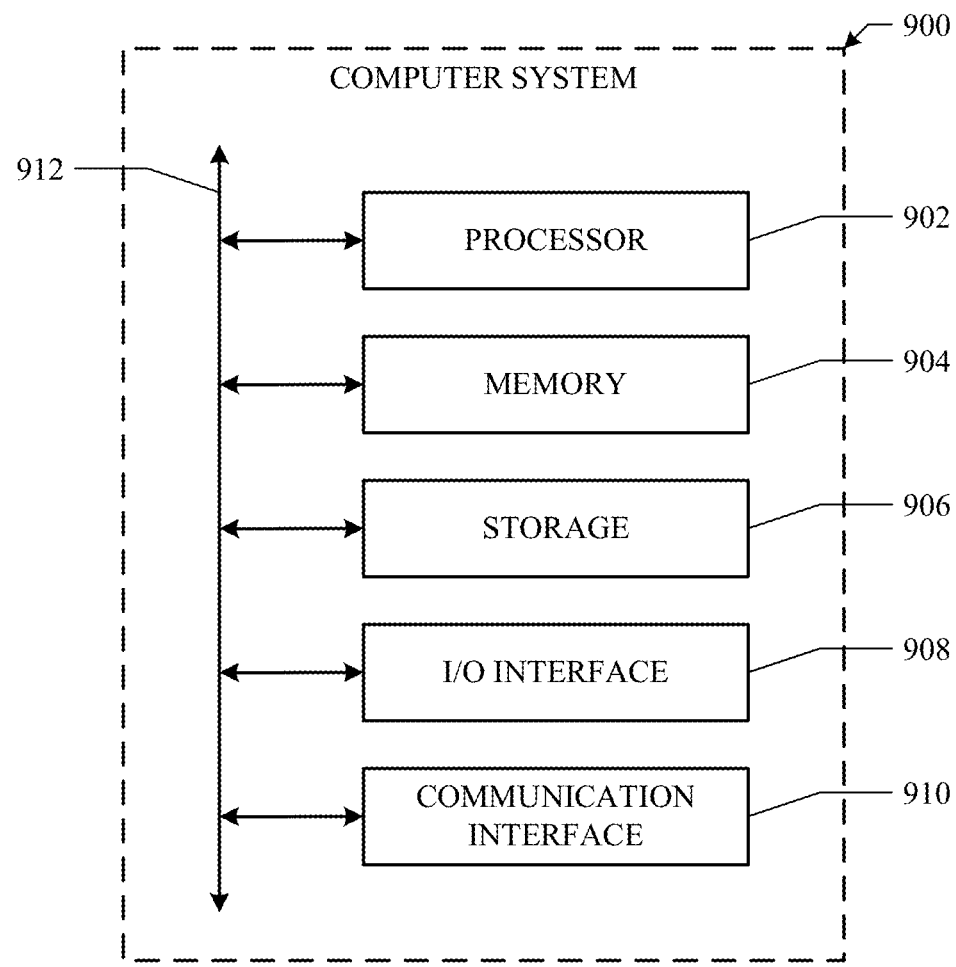
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   receiving an image of a real environment using a camera worn by a user, the image of the real environment comprising an object of interest;
   determining that a portion of the image of the real environment comprises the object of interest;
   generating, based on the portion of the image of the real environment comprising the object of interest, a two-dimensional surface representing the object of interest;
   receiving depth measurements of the real environment corresponding to the portion of the image of the real environment comprising the object of interest;
   determining, based on the depth measurements, a depth of the two-dimensional surface representing the object of interest;
   determining, based one or more previous images of the object of interest, a predicted pose of the object of interest at a time subsequent to when the image of the real environment was captured;
   posing the two-dimensional surface in a coordinate system corresponding to the real environment based on the depth of the two-dimensional surface and the predicted pose of the object of interest;
   determining a visibility of a virtual object relative to the object of interest by comparing a model of the virtual object with the two-dimensional surface; and
   generating an output image based on the determined visibility of the virtual object.

2. The method of claim 1, wherein determining the predicted pose of the object of interest is based on:
   one or more movements of the camera worn by the user subsequent to a time the image of the real environment is captured; or
   one or more movements of the object of interest prior to when the image of the real environment is captured.

3. The method of claim 2, wherein the predicted pose of the object of interest is determined by one or more components of the computing system that are physically connected to a headset worn by the user.

4. The method of claim 1, wherein determining the portion of the image of the real environment that comprises the object of interest comprises:
   generating, using a neural network of a machine learning model, a bounding box encompassing the object of interest; and
   outputting, using the bounding box, a segmentation mask associated with the object of interest.

5. The method of claim 4, wherein the two-dimensional surface is based on the segmentation mask associated with the object of interest.

6. The method of claim 1, wherein determining the depth of the two-dimensional surface representing the object of interest comprises:
   removing one or more outliers from the depth measurements;
   generating, after removing the one or more outliers, a histogram comprising the depth measurements; and
   determining, using the histogram, a most-frequently observed value of the depth measurements.

7. The method of claim 1, wherein the two-dimensional surface comprises a plurality of texels, wherein each texel is assigned a value that specifies a level of transparency that is to be accorded to that texel.

8. The method of claim 1, wherein the depth measurements are calculated relative to a pose of the camera at a time the image of the real environment is captured.

9. The method of claim 1, wherein the camera worn by the user is connected to a head-mounted display.

10. The method of claim 1, wherein the two-dimensional surface is generated without accessing a three-dimensional model of the object of interest.

11. One or more computer-readable non-transitory storage media embodying software that is operable when executed by one or more processors to:
  receive an image of a real environment using a camera worn by a user, the image of the real environment comprising an object of interest;
  determine that a portion of the image of the real environment comprises the object of interest;
  generate, based on the portion of the image of the real environment comprising the object of interest, a two-dimensional surface representing the object of interest;
  receive depth measurements of the real environment corresponding to the portion of the image of the real environment comprising the object of interest;
  determine, based on the depth measurements, a depth of the two-dimensional surface representing the object of interest;
  determine, based one or more previous images of the object of interest, a predicted pose of the object of interest at a time subsequent to when the image of the real environment was captured;
  pose the two-dimensional surface in a coordinate system corresponding to the real environment based on the depth of the two-dimensional surface and the predicted pose of the object of interest;
  determine a visibility of a virtual object relative to the object of interest by comparing a model of the virtual object with the two-dimensional surface; and
  generate an output image based on the determined visibility of the virtual object.

12. The one or more computer-readable non-transitory storage media of claim 11, wherein determining the predicted pose of the object of interest is based on:
  one or more movements of the camera worn by the user subsequent to a time the image of the real environment is captured; or
  one or more movements of the object of interest prior to when the image of the real environment is captured.

13. The one or more computer-readable non-transitory storage media of claim 12, wherein the predicted pose of the object of interest is determined by one or more components of a computing system that are physically connected to a headset worn by the user.

14. The one or more computer-readable non-transitory storage media of claim 11, wherein determining the portion of the image of the real environment that comprises the object of interest comprises:
  generating, using a neural network of a machine learning model, a bounding box encompassing the object of interest; and
  outputting, using the bounding box, a segmentation mask associated with the object of interest.

15. The one or more computer-readable non-transitory storage media of claim 11, wherein determining the depth of the two-dimensional surface representing the object of interest comprises:
  removing one or more outliers from the depth measurements;
  generating, after removing the one or more outliers, a histogram comprising the depth measurements; and
  determining, using the histogram, a most-frequently observed value of the depth measurements.

16. A system comprising:
  one or more processors; and
  one or more computer-readable non-transitory storage media coupled to the one or more processors and comprising instructions operable when executed by the one or more processors to cause the system to:
  receive an image of a real environment using a camera worn by a user, the image of the real environment comprising an object of interest;
  determine that a portion of the image of the real environment comprises the object of interest;
  generate, based on the portion of the image of the real environment comprising the object of interest, a two-dimensional surface representing the object of interest;
  receive depth measurements of the real environment corresponding to the portion of the image of the real environment comprising the object of interest;
  determine, based on the depth measurements, a depth of the two-dimensional surface representing the object of interest;
  determine, based one or more previous images of the object of interest, a predicted pose of the object of interest at a time subsequent to when the image of the real environment was captured;
  pose the two-dimensional surface in a coordinate system corresponding to the real environment based on the depth of the two-dimensional surface and the predicted pose of the object of interest;
  determine a visibility of a virtual object relative to the object of interest by comparing a model of the virtual object with the two-dimensional surface; and
  generate an output image based on the determined visibility of the virtual object.

17. The system of claim 16, wherein determining the predicted pose of the object of interest is based on:
  one or more movements of the camera worn by the user subsequent to a time the image of the real environment is captured; or
  one or more movements of the object of interest prior to when the image of the real environment is captured.

18. The system of claim 17, wherein the predicted pose of the object of interest is determined by one or more components of a computing system that are physically connected to a headset worn by the user.

19. The system of claim 16, wherein determining the portion of the image of the real environment that comprises the object of interest comprises:
  generating, using a first neural network of a machine learning model, a bounding box encompassing the object of interest; and
  outputting, using the bounding box, a segmentation mask associated with the object of interest.

20. The system of claim 16, wherein determining the depth of the two-dimensional surface representing the object of interest comprises:
  removing one or more outliers from the depth measurements;

generating, after removing the one or more outliers, a histogram comprising the depth measurements; and determining, using the histogram, a most-frequently observed value of the depth measurements.

\* \* \* \* \*